(12) United States Patent
McGuire et al.

(10) Patent No.: US 7,022,283 B2
(45) Date of Patent: Apr. 4, 2006

(54) APPARATUS AND METHOD FOR PRESERVING COLLECTIBLE ITEMS

(75) Inventors: Timothy C. McGuire, Reno, NV (US); Daniel N. O'Connor, Reno, NV (US)

(73) Assignee: Vin Valet, Inc., Reno, NV (US)

( * ) Notice: Subject to any disclaimer, the term of this patent is extended or adjusted under 35 U.S.C. 154(b) by 207 days.

(21) Appl. No.: 10/390,843

(22) Filed: Mar. 18, 2003

(65) Prior Publication Data

US 2003/0177912 A1 Sep. 25, 2003

Related U.S. Application Data

(63) Continuation-in-part of application No. 09/995,090, filed on Nov. 26, 2001, now Pat. No. 6,557,459.

(51) Int. Cl.
*A47B 77/08* (2006.01)
(52) U.S. Cl. .................. 422/40; 422/305; 422/292; 312/31; 312/236; 99/323.1
(58) Field of Classification Search .............. 99/323.1, 99/323.2, 467, 468, 473, 474; 422/305, 904, 422/4, 40, 109, 292, 300, 28, 31, 32, 1; 62/179, 62/78, 127, 18; 312/31, 31.01, 31.1, 31.2, 312/236
See application file for complete search history.

(56) References Cited

U.S. PATENT DOCUMENTS

| | | | |
|---|---|---|---|
| 1,531,558 A | 3/1925 | Lehmann | |
| 2,134,644 A | 10/1938 | Sadler | |
| 3,139,219 A | 6/1964 | Gran | |
| 3,195,779 A | 7/1965 | Nicko | |
| 3,205,049 A | * 9/1965 | Lannert et al. | ............. 422/109 |
| 4,246,295 A | 1/1981 | Crihan | |
| 4,303,009 A | * 12/1981 | La Monica | .................. 99/474 |
| 4,322,001 A | 3/1982 | Hurley | |
| 4,439,213 A | 3/1984 | Frey et al. | |
| 4,572,723 A | 2/1986 | Ward | |
| 4,829,774 A | 5/1989 | Wassibauer et al. | |
| 4,925,461 A | 5/1990 | Gemba et al. | |
| 4,976,109 A | 12/1990 | Garrett | |
| 4,979,609 A | 12/1990 | Harlan et al. | |

(Continued)

OTHER PUBLICATIONS

Wine Preservation Systems published by wineaccessory.com (website) and printed on Apr. 11, 2001.

(Continued)

*Primary Examiner*—Reginald L. Alexander
(74) *Attorney, Agent, or Firm*—Bell, Boyd & Lloyd, LLC

(57) ABSTRACT

The present invention relates to an apparatus and method for preserving one or more collectible items. The apparatus includes a housing and a nitrogen generator. A nitrogen generator generates a nitrogen rich gas and supplies the nitrogen gas to the housing, which displaces the oxygen inside the housing to preserve the collectible item or items enclosed by the housing. The nitrogen rich gas significantly reduces the degradation of the collectible item due to the exposure of the item to oxygen in the air. In another embodiment, the apparatus further includes a temperature control system and a humidity control system to control the temperature and humidity inside the housing. This further aids in preserving a collectible item for relatively long periods of time by reducing the effects of the environment on the item.

88 Claims, 23 Drawing Sheets

U.S. PATENT DOCUMENTS

| | | | |
|---|---|---|---|
| 4,979,619 A | 12/1990 | Hager | |
| 5,004,482 A | 4/1991 | Haas et al. | |
| 5,040,671 A | 8/1991 | Hager | |
| 5,082,110 A | 1/1992 | Hager | |
| 5,228,888 A * | 7/1993 | Gmelin et al. | 95/96 |
| 5,259,136 A | 11/1993 | Goserud | |
| D352,660 S | 11/1994 | Stribiak | |
| 5,370,223 A | 12/1994 | Leicht, Jr. | |
| 5,379,892 A | 1/1995 | Reams et al. | |
| 5,441,558 A | 8/1995 | Lee et al. | |
| 5,451,248 A | 9/1995 | Sadkowski et al. | |
| 5,505,765 A | 4/1996 | Kaji et al. | |
| 5,515,693 A | 5/1996 | Cahill-O'Brien et al. | |
| 5,735,938 A | 4/1998 | Baksh et al. | |
| 5,906,673 A | 5/1999 | Reinhold, III et al. | |
| 5,906,674 A | 5/1999 | Tan et al. | |
| 6,029,807 A | 2/2000 | Love | |
| 6,070,576 A | 6/2000 | Banucci et al. | |
| 6,149,003 A | 11/2000 | Day | |
| 6,210,013 B1 * | 4/2001 | Bousfield | 362/92 |
| 6,308,831 B1 | 10/2001 | Saxe et al. | |
| 6,460,352 B1 | 10/2002 | Lemcoff et al. | |
| 6,527,831 B1 | 3/2003 | Baksh et al. | |
| 6,544,318 B1 | 4/2003 | Dee et al. | |
| 6,557,459 B1 * | 5/2003 | Phelps et al. | 99/323.1 |
| 6,560,974 B1 | 5/2003 | Kroll et al. | |
| 2002/0033023 A1 | 3/2002 | Kroll et al. | |

OTHER PUBLICATIONS

My Thoughts published by food4.epicurious.com (website) and printed on Apr. 11, 2001.

WineKeeper®—How It Works published by www.winekeper.com (website) and printed Jul. 11, 2001.

Vacu-Vin Vacuum Sealers published by wineaccessory.com (website) and printed Jul. 24, 2001.

The Wine Enthusiast® Catalog published by The Wine Enthusiast (not dated).

* cited by examiner

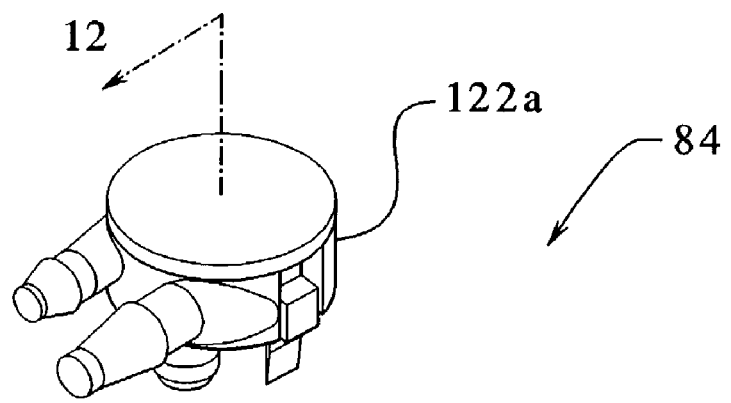
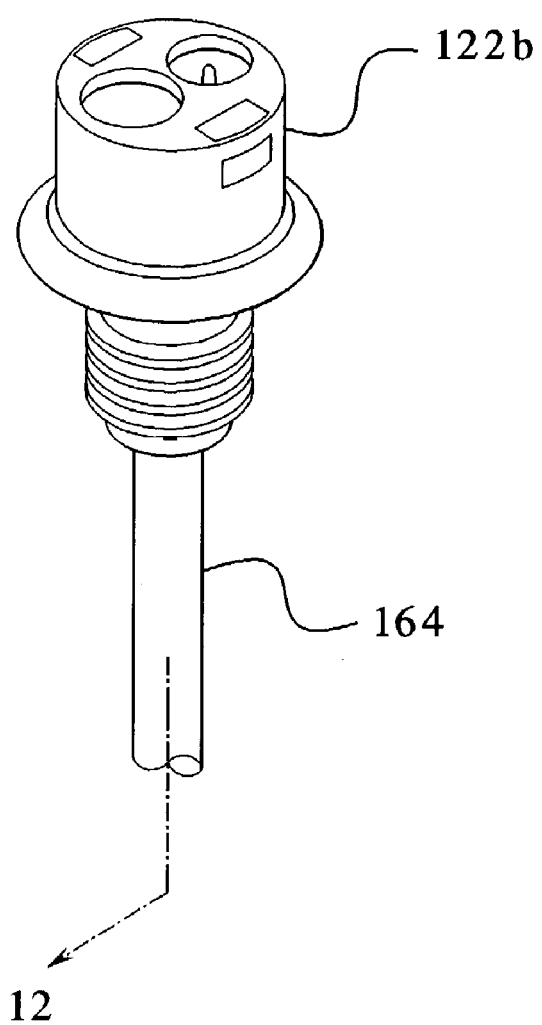
FIG.8

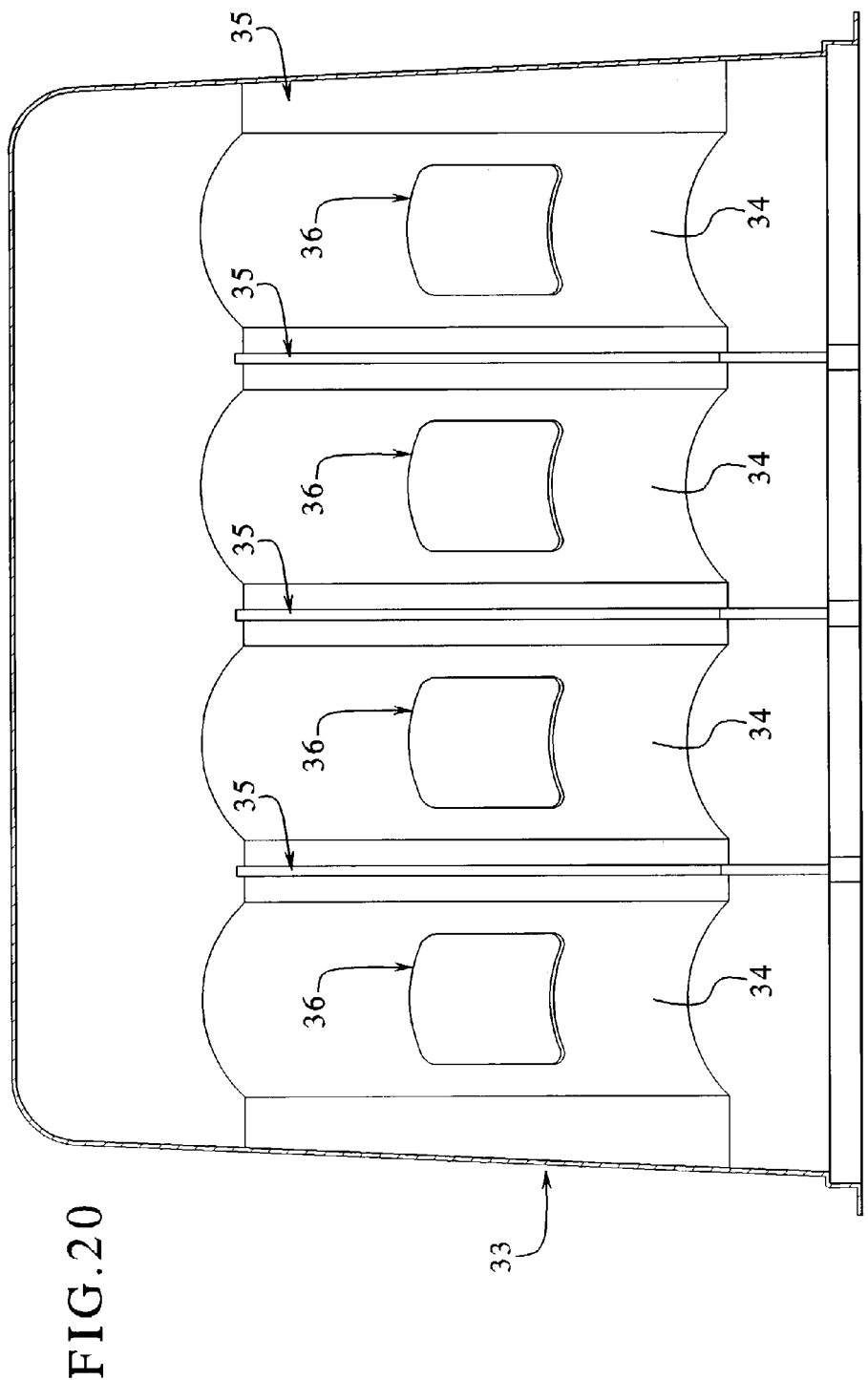

APPARATUS AND METHOD FOR PRESERVING COLLECTIBLE ITEMS

PRIORITY CLAIM

This application is a continuation-in-part of and claims the benefit of U.S. patent application Ser. No. 09/995,090, now U.S. Pat. No. 6,557,459 filed Nov. 26, 2001, which is incorporated here in its entirety by reference.

CROSS-REFERENCE TO RELATED APPLICATIONS

This patent application is related to the following co-pending commonly owned patent applications: "WINE OR CHAMPAGNE PRESERVATION AND DISPENSING APPARATUS," Ser. No. 09/996,332, "STOPPER FOR WINE OR CHAMPAGNE PRESERVATION AND DISPENSING APPARATUS," Ser. No. 09/995,309, "COOLING SYSTEM FOR WINE OR CHAMPAGNE PRESERVATION AND DISPENSING APPARATUS," Ser. No. 09/997,307, and "NITROGEN GENERATOR FOR WINE OR CHAMPAGNE PRESERVATION AND DISPENSING APPARATUS," Ser. No. 09/995,090.

BACKGROUND OF THE INVENTION

The present invention relates to an apparatus and method for preserving collectible items.

Millions of people collect different types of items, such as artwork, baseball and other trading cards, artwork, clothes, letters, magazines and books, wedding dresses and other clothes and heirlooms. Some of these collectible items are saved as "keepsakes," because the items have sentimental value. Some are purchased and saved as investments because the collectibles should improve in value over time (i.e., paintings). As a result, owners of such collectible items tend to keep the collectible items for relatively long periods of time. Collectible items retain greater value when they are maintained in good condition and are not allowed to deteriorate. If collectible items are damaged or show degradation or deterioration due to exposure to sunlight, undesired humidity, undesired temperatures, undesired air components such as oxygen and other environmental conditions, the collectible items have significantly less value than collectible items without such damage.

Accordingly, a need exists for a preservation apparatus and method which provides safe and reliable preservation of collectible items.

SUMMARY OF THE INVENTION

One embodiment of the present invention relates in general to an apparatus for preserving and dispensing wine or champagne. One embodiment of the apparatus is adapted to preserve and dispense wine from a plurality of wine bottles or preserve and dispense champagne from a plurality of champagne bottles. It should be appreciated that the present invention could be adapted for one bottle or container or multiple bottles or containers. The apparatus generally includes a housing having a frame and an access door pivotally connected to the frame which defines an interior chamber in the housing; a container support mounted in the interior chamber of the housing; a nitrogen generator mounted in the housing for generating nitrogen rich gas from ambient air and supplying the nitrogen rich gas for the wine or champagne bottles; a cooling system mounted in the housing for selectively chilling one or more bottles; one or more stoppers which are adapted to be attached to the wine or champagne bottles; and one or more dispensers attached to the housing and connected to the stoppers for dispensing wine or champagne from the bottles. The apparatus is preferably suitably sized to be placed on any flat surface such as a kitchen counter and includes a conventional power source having an electric cord and plug which is suitable for a standard electrical outlet.

The door of the housing provides access to the interior chamber or compartment of the housing and preferably includes a transparent or translucent window that enables a user to view the bottles inside the housing through the door when the door is closed. The container support holds a plurality of bottles and is mounted in the interior chamber or compartment of the housing. The support is preferably formed to receive a standard size wine or champagne bottle. Each bottle is supported by the container support at an angle for optimal viewing purposes, to minimize the height of the housing and to minimize the footprint of the housing on the counter top. The angle is greater than zero degrees and less than or equal to ninety degrees, is preferably between twenty degrees and seventy degrees and is most preferably between thirty-five and fifty degrees. In the illustrated embodiment, the angle is approximately thirty-eight degrees.

Each of the plurality of stoppers is adapted to be removably mounted in the opening of a bottle (i.e., after the bottle is opened or the cork is removed) to seal the bottle. Each stopper is connected to the nitrogen generator and the dispenser or dispensing system through suitable tubing or fluid (i.e., gas) communication lines. More specifically, each stopper includes a sealing member that seals the opening of the bottle, and a communication member that is removably attached to the sealing member. The sealing member is mounted in the opening of the bottle and seals the bottle from the outside air after the sealing member is connected to the communication member. The sealing member remains inside the bottle opening until the bottle is empty. Tubing from the nitrogen generator and the fluid dispenser or dispensing system is connected to the communication member. The communication member enables the nitrogen rich gas to enter the wine bottle and the wine to be drawn out of the bottle to the dispenser while preventing oxygen from re-entering the bottle. By keeping the oxygen out of the bottle, the flavor or taste of the wine (or champagne) remains long after the bottle is opened. It should be appreciated that wine and champagne are preferably maintained under different pressures in separate dispensing apparatuses of the present invention as discussed below.

Accordingly, to place a wine or champagne bottle in the interior chamber of the housing, a valve in the nitrogen port of the communication member is actuated to prevent the nitrogen rich gas from leaking out of the communication member when the communication member is disconnected from the sealing member. When the communication and sealing members are disconnected, the sealing member can be inserted into a new open bottle and the communication member reconnected to the sealing member. Upon reconnection, the valve is then actuated to permit the flow of nitrogen rich gas. It should be appreciated that the stoppers are interchangeable for use in different embodiments of the wine or champagne preservation and dispensing apparatus such as a portable apparatus as described below.

The nitrogen generator automatically generates nitrogen rich gas necessary for preserving wine or champagne inside the wine or champagne bottles. The nitrogen generator compresses ambient air and forces the air through an oxygen adsorbing member such as a carbon molecular sieve. The sieve preferentially adsorbs the oxygen molecules from the air and allows the nitrogen and other inert gases found in the atmosphere, to pass through the sieve. The collected nitrogen rich gas which is temporarily stored in a nitrogen gas storage tank and when necessary, is communicated through suitable tubing to the bottles. The nitrogen rich gas fills the head space over the liquid inside the bottles and blankets the liquid. The nitrogen rich gas blanket preserves the wine or champagne for a substantial period of time. The nitrogen generator generates nitrogen rich gas from air and accordingly eliminates the need to refill or replace nitrogen storage containers of the known devices described above.

The nitrogen generator efficiently separates nitrogen and other inert gases from the air for use in the wine or champagne dispensing apparatuses. However, it should be appreciated, that the nitrogen generator of the present invention does not need to be extremely efficient due to the unlimited supply of air and because substantial volumes of nitrogen rich gas are not needed due to the limited size of the bottles and because of the high levels of nitrogen in the atmosphere. This is contrary to existing commercial or industrial nitrogen gas generation systems which focus on efficiency and production volumes to maximize profit.

Inside the housing, one or more wine or champagne bottles may be chilled or cooled as desired. In one embodiment, a thermoelectric cooling unit draws in ambient air, removes the moisture from the air and cools the air according to a desired temperature inputted by a user. The cooled air is circulated by a fan located inside the housing. The fan supplies the cooled air to the desired sections of the interior compartments of the housing and cools or chills the wine or champagne bottles until a desired temperature is obtained. In one embodiment, the apparatus also includes one or more divider panels, which can be inserted in slots formed in the container support to separate certain bottles. In one embodiment, each divider panel preferably includes an air baffle, which may be manually adjusted between a fully open position, a partially open position or a closed position. The air baffles enable cooled air to pass through openings in the baffles to cool other divided sections in the housing to a desired temperature. Therefore, the divider panels facilitate the chilling of the bottles positioned on the container support adjacent to the cooling system and insulate the bottles positioned on the container support opposite the cooling system and on the other side of the divided panels. The divider panels thus enable a user to chill one or more wine bottles while keeping other bottles at a warmer temperature.

In another embodiment of the present invention, the cooling system includes cooling transfer members such as cooling pads or gel packs cooled by a thermoelectric cooling plate. In this embodiment, the container support has an inner and outer surface and a plurality of bottle receptacles for holding bottles on the support. Each receptacle has an area or a cutout or opening. A thermo-electric cooling plate is mounted below and adjacent to the inner surface of the container support and underneath each area or opening. The thermo-electric cooling plate is powered by a suitable power source and provides a cold top surface for chilling the bottles to a temperature that is less than ambient temperature. Alternatively, a plurality of cooling plates may be used for all areas. To generate the cold top surface, the thermo-electric cooling plate reverses the polarity of the metal plate. The reversed polarity creates a cold top plate surface and a warm bottom plate surface. The removable cooling transfer member or cooling pad is placed between the bottle and the thermoelectric cooling plate to transfer the cold temperature from the top surface of the cooling plate to the bottle (or to transfer heat from the bottle to the cooling plate). The temperature of a bottle can be adjusted by changing the amount or area of the cooling transfer member or cooling pad surface that contacts the cold surface of the thermoelectric cooling plate and the bottle. Alternatively, different size cooling transfer members or cooling pads may be employed. One or more bottles may be chilled using this cooling system.

The dispensing apparatus provides wine or champagne to a user or consumer through dispensers, such as spigots or faucets, mounted on the front of the housing. When a lever on a dispenser is actuated, a valve inside the dispenser opens and draws wine or champagne from the wine or champagne bottles and out of the dispenser. Releasing the lever causes the valve to close and stop the flow of wine or champagne out of the dispenser. Simultaneously, the nitrogen communication line, a one-way system, supplies nitrogen rich gas from the nitrogen storage tank into the bottle and continues to prevent oxygen from entering the bottle.

More specifically, the fluid pressure within the fluid communication lines of the wine preservation and dispensing apparatus preferably is set at approximately 5 pounds per square inch (psi). The pressure within the apparatus causes the internal pressure to be greater than the ambient pressure outside of the apparatus and therefore an unequal balance of pressure is created in the fluid communication lines of the dispensing system. When the dispenser valve is opened, the internal fluid pressure in the fluid communication lines of the apparatus pushes the fluid out of the bottles and into communication tubes that extend down into the bottles from the stopper assemblies. The wine or champagne travels through the communication tubes to the dispensers and then out of the dispensers to a user's glass.

In another embodiment, the wine or champagne preservation and dispensing apparatus is portable. The portable apparatus includes an insulated portable pack that preferably holds up to two wine or champagne containers; a cooling system which maintains a desired bottle temperature; and a nitrogen generator which generates nitrogen rich gas to preserve the wine or champagne in the containers. The stoppers used in the primary embodiment are interchangeable between the portable apparatus and the stationary apparatus in the primary embodiment of the present invention. The interchangeable stoppers enable a user to transfer a wine or champagne bottle from one apparatus to another quickly and with minimal exposure to the oxygen in the air. The portable apparatus may be powered by a conventional electrical plug and outlet; a cigarette lighter attachment for use in a car or other vehicle; a rechargeable battery; or other suitable power source. The portable apparatus enables a user to transport and consume wine or champagne outside of their home while preserving the quality and flavor of the wine or champagne.

In a further embodiment, the portable apparatus includes an insulated portable carrying pack and a nitrogen cartridge for providing nitrogen to preserve the wine or champagne in the pack. The nitrogen cartridge is refillable and in one embodiment can be refilled using a nitrogen dispenser as described below.

In yet a further embodiment, the portable apparatus includes a stopper, a nitrogen cartridge or storage tank, a spout, a bottle or container securing member, and a clamp or holder for transporting, preserving and dispensing a single bottle of wine or champagne. The clamp snaps over the circumference of a bottle and secures the apparatus to the bottle. The stopper fits into the bottle opening and a nitrogen fill port enables a user to attach the apparatus to a nitrogen dispenser, such as a refillable nitrogen cartridge, to fill the nitrogen storage tank. A user tilts the bottle and presses a button to release nitrogen from the nitrogen storage tank and into the bottle. The pressure of the nitrogen forces the wine or champagne out of the spout and into a user's glass. The nitrogen preserves the remaining wine or champagne in the bottle for future use.

In another embodiment, a nitrogen dispenser enables a user to fill or re-fill the nitrogen cartridges used in the portable wine or champagne preservation and dispensing apparatuses. The nitrogen dispenser has a docking bay, which can be integrally formed with the stationary version or a stand alone version of the wine or champagne dispensing apparatus, which includes an attachment for connecting the nitrogen cartridges. In a further embodiment, the nitrogen dispenser is a separate unit that is attachable to a side of the stationary apparatus, or is integrally formed with the side, and is connected or connectable to one of the nitrogen communication lines in that apparatus.

In alternative embodiments, the nitrogen generator is employed to preserve collectible items as described above. The nitrogen rich gas generated by the nitrogen generator replaces the air and specifically, the oxygen in the air in a housing or other suitable container to provide a nitrogen blanket inside the housing, which significantly reduces the environmental degradation (i.e., aging) and deterioration of such collectible items.

In a preferred alternative embodiment, the nitrogen generator of the present invention is employed in an apparatus for preserving collectible items which includes a housing that protects and preserves the collectible items and keeps the collectible items from external conditions.

More specifically, the present invention provides an apparatus or a collectible item preserver which includes a housing and a nitrogen generator. The nitrogen generator is mounted inside and is connected to or otherwise in communication with the housing. In one embodiment, the housing includes an upper, first or item storing compartment and a lower, second or mechanism storing compartment. The item storing compartment of the housing encloses the collectible item or collectible items which are being preserved by the apparatus. In one embodiment, the item storing compartment is manufactured using a suitable transparent material or a substantially transparent material (such as glass or plastic), which enables a person to view the collectible item or items stored inside the housing. In another embodiment, the item storing compartment is manufactured using a substantially non-transparent and non-translucent material. This type of material prevents sunlight from entering the housing and thereby prevents exposure of the collectible item or items in the housing to the sunlight. Additionally, the item storing compartment is also manufactured using an air-tight, substantially rigid material, which prevents air from entering the housing and which is not easily broken, punctured or otherwise penetrable. This further protects the collectible item stored in or displayed in the housing.

In one embodiment, the item storing compartment includes a one-way exhaust port, which facilitates exhausting of the air displaced by the nitrogen gas supplied to the housing from the nitrogen generator. The exhaust port may be mounted in any suitable surface of the housing. In one preferred embodiment, the exhaust port includes a check valve or other suitable valve which enables air to be exhausted from the housing while preventing air from re-entering the housing through the exhaust port. The exhaust port is preferably positioned and attached to the housing such that the exhaust port is not visible by a person viewing a collectible item inside the housing. In one embodiment, the item storing compartment of the housing includes a lockable door or other suitable access panel which enables a user to open the item storing compartment of the housing to place a collectible item inside the housing or remove the collectible item from the housing. The door may be any suitable type of door or access panel.

In one embodiment, the lower compartment of the housing is manufactured using a substantially rigid material to enclose the nitrogen generator and protect the nitrogen generator from damage and/or tampering. In one embodiment, the lower compartment is manufactured using a non-transparent material or substantially non-transparent material so that the nitrogen generator and other components are not visible to a person viewing the collectible item inside the housing.

In one embodiment, the nitrogen generator is positioned and mounted inside the lower or mechanism storing compartment of the housing. In addition to the components of the nitrogen generator which are described in more detail above and below, the nitrogen generator in this embodiment includes an inlet port and at least one outlet port. The outlet port or ports or channels of the nitrogen generator are attached to a lower or communication surface of the item storing compartment such that an air-tight seal is formed between the perimeter of the outlet ports and the surface of the item storing compartment. This facilitates the supply of the nitrogen rich gas generated by the nitrogen generator to the upper or storing compartment of the collectible item preserver. The inlet port of the nitrogen generator draws in ambient air (which includes oxygen) from outside of the housing and supplies the air to the carbon molecular sieve as describe above. The carbon molecular sieve separates the nitrogen from the air and supplies nitrogen rich gas to the housing. In one embodiment, the nitrogen generator is powered by electrical power supplied to the nitrogen generator through a power cord attached to the generator in a conventional manner. In another embodiment, a rechargeable battery powers the nitrogen generator for use at remote locations in a conventional manner. It should be appreciated that the nitrogen generator of the collectible item preserver does not need to be directly connected to the item storing compartment. In such case, the nitrogen generator must be in suitable communication with such compartment.

A collectible item or items are attached to or secured to the housing using a suitable support, which is manufactured to accommodate the weight and size of the particular collectible item being displayed and/or stored. The support may be attached to any one or more of the inside surfaces or walls of the housing and specifically, the item storing compartment of the housing.

In one embodiment, a collectible item such as a painting is positioned and secured inside the item storing compartment of the housing. The collectible item is sealed inside the item storing compartment so as to minimize the effects of outside air and other environmental conditions on the collectible item. The housing is positioned and secured in place in the area in which the housing may be stored and/or displayed. The nitrogen generator draws in air and begins to generate nitrogen rich gas which is supplied or communicated to the item storing compartment of the housing. At the same time, the exhaust port exhausts the displaced air from the housing through the exhaust port of the housing. It should be appreciated that the nitrogen generator could include the exhaust port and some or all of the air drawn in by the nitrogen generator could be drawn in from inside the item storing compartment or container. The nitrogen is supplied to the housing and specifically the item storing compartment of the housing until a predetermined or desired nitrogen level is achieved inside the item storing compartment. Once the desired nitrogen level is achieved inside the item storing compartment, the nitrogen level is monitored using a suitable monitoring device such as a digital display or similar display that enables a user to see the level of the nitrogen inside the item storing compartment.

In an another alternative embodiment of the present invention, the preservation apparatus includes a nitrogen generator and a temperature control system and/or a humidity control system. The nitrogen generator operates as described above. In one embodiment, the temperature controller or control system controls the temperature inside the item storing compartment of the housing to further enhance the preservation of the collectible item in the housing. In one embodiment, the temperature control system adjusts the temperature of the nitrogen rich gas inside the housing to a desired temperature set by a user. In one embodiment, the humidity control system controls the humidity (i.e., the moisture level) inside the item storing compartment to further preserve the collectible item inside the housing. The humidity control system adjusts the humidity of the nitrogen rich gas inside the housing according to desired humidity levels set by the user. The combination of the nitrogen generator, temperature control system and/or the humidity control system further enhance the preservation of a collectible item stored inside the housing. The temperature and humidity controllers are preferably conventional, commercially acceptable mechanisms.

In one embodiment, the collectible item preserver of the present invention includes a suitable controller such as a computer or processor in communication with or which controls the temperature control system, the humidity control system and/or the nitrogen generator to control the operation of each of these units. A user may enter the desired levels for each of the units and thereby control the units. This may also be done or monitored from a remote location via suitable conventional communication devices. Furthermore, the computer may be programmed to monitor and control each of the individual systems and/or units automatically based on predetermined temperature, humidity and nitrogen levels set by the user.

In another embodiment, a light source (not shown) such as light emitting diode (LED), battery operated light or other suitable light source, is attached to an interior surface or wall of the item storing compartment of the housing. The light source illuminates the displayed collectible item to enable a viewer to better see or view the collectible item in the housing. One or a plurality of light sources may be attached to a surface inside the item storing compartment. In addition, the light source or sources may be attached to one or a plurality of the interior surfaces of the item storing compartment.

It is therefore an advantage of the present invention to provide a self-contained and fully automatic collectible item preservation apparatus.

Another advantage of the present invention is to provide a collectible item preservation apparatus that may be used in commercial, non-commercial and residential settings.

Other objects, features and advantages of the invention will be apparent from the following detailed disclosure, taken in conjunction with the accompanying sheets of drawings, wherein like numerals refer to like parts, elements, components, steps and processes.

BRIEF DESCRIPTION OF THE FIGURES

FIG. 8 is a partially exploded perspective view of one embodiment of a stopper of the wine or champagne preservation and dispensing apparatus of FIG. 1 showing the communication member separated from the sealing member.

FIG. 20 is a front elevation view of the container support illustrating the areas or openings for the cooling system and the divider panel slots between each container receptacle in the container support.

DETAILED DESCRIPTION OF THE INVENTION

Referring to one embodiment of the present invention, people who drink wine or champagne may only drink one glass, part of a bottle or some other quantity after opening a bottle. The wine or champagne preservation and dispensing apparatus of the present invention operates to preserve the flavor of the remaining quantity of wine or champagne in an opened bottle for a substantial period of time and also operates to dispense wine or champagne on an as needed basis. Referring now to FIGS. 1 through 4, the wine or champagne preservation and dispensing apparatus of one embodiment of the present invention, generally designated by the numeral 10, is alternatively referred to herein as the preservation apparatus, the dispensing apparatus or the apparatus. It should be appreciated that while the present invention is illustrated and discussed herein relative to an apparatus suitable for holding four bottles of wine or champagne, the present invention contemplates one or more bottles of wine or champagne. It should also be appreciated that wine and champagne are preferably maintained in separate dispensing apparatuses of the present invention due to the different levels of pressure needed to maintain wine and champagne, and that the dispensing apparatus of the present invention could be configured to maintain both wine and champagne. For purposes of one embodiment of this application, the apparatus is generally discussed with respect to the wine dispensing apparatus. Another embodiment is generally discussed with relation to an apparatus for preserving collectible items.

Figure 1:
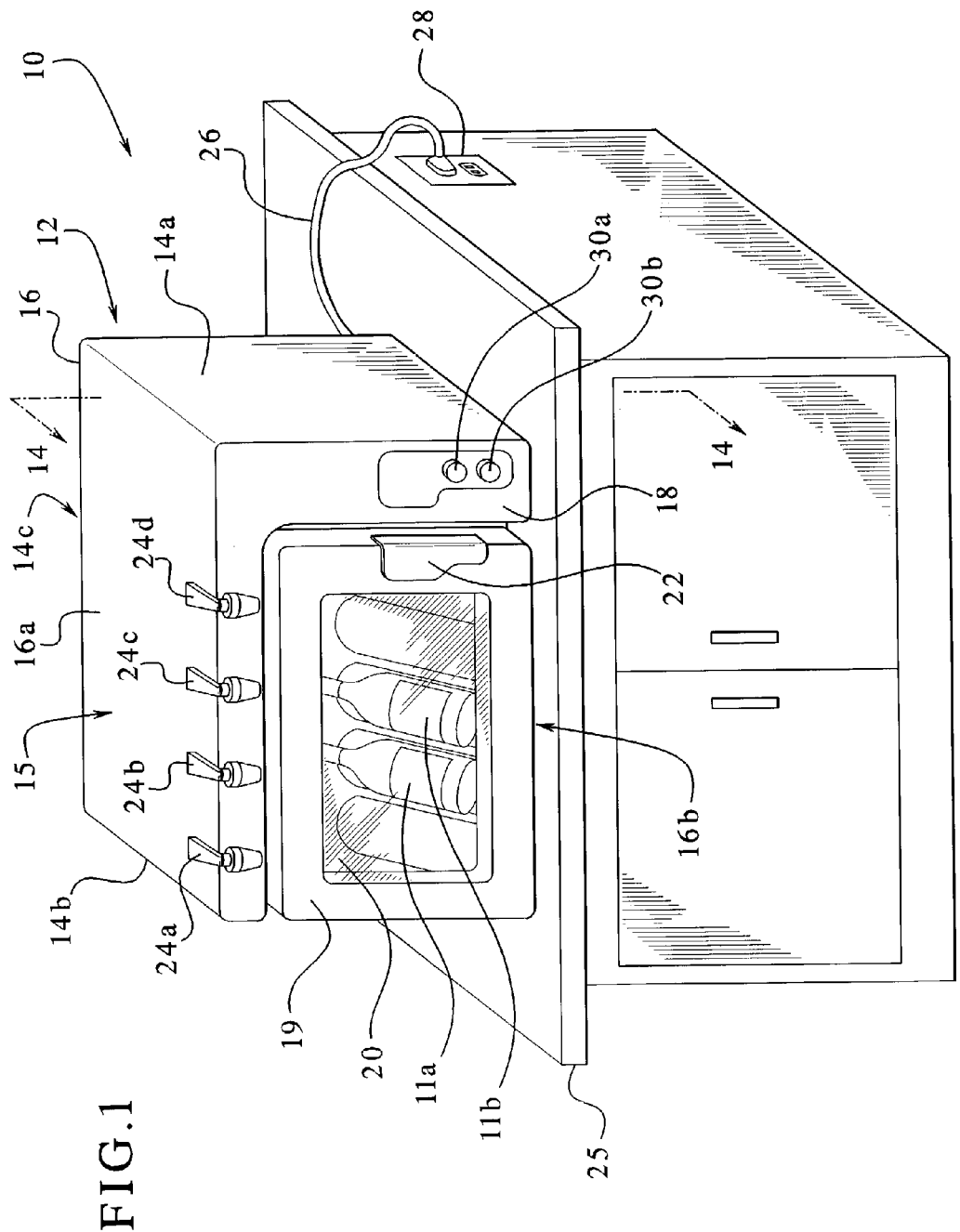
FIG. 1 is a front perspective view of the wine or champagne preservation and dispensing apparatus of one embodiment of the present invention with the door in closed position and with bottles viewable through the glass in the door.
Figure 2:
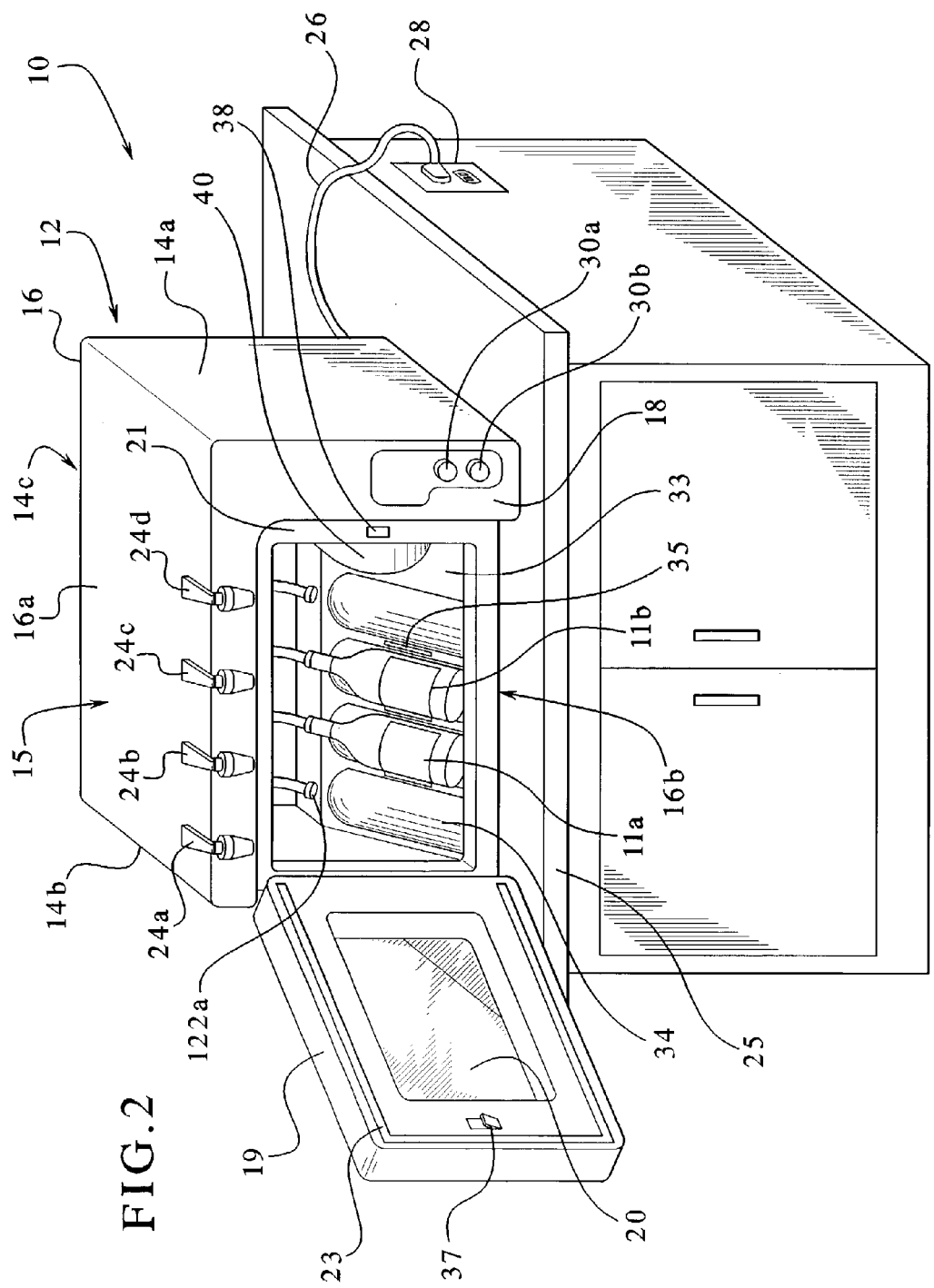
FIG. 2 is a front perspective view of the wine or champagne preservation and dispensing apparatus of FIG. 1 with the door in the open position.
Figure 3:
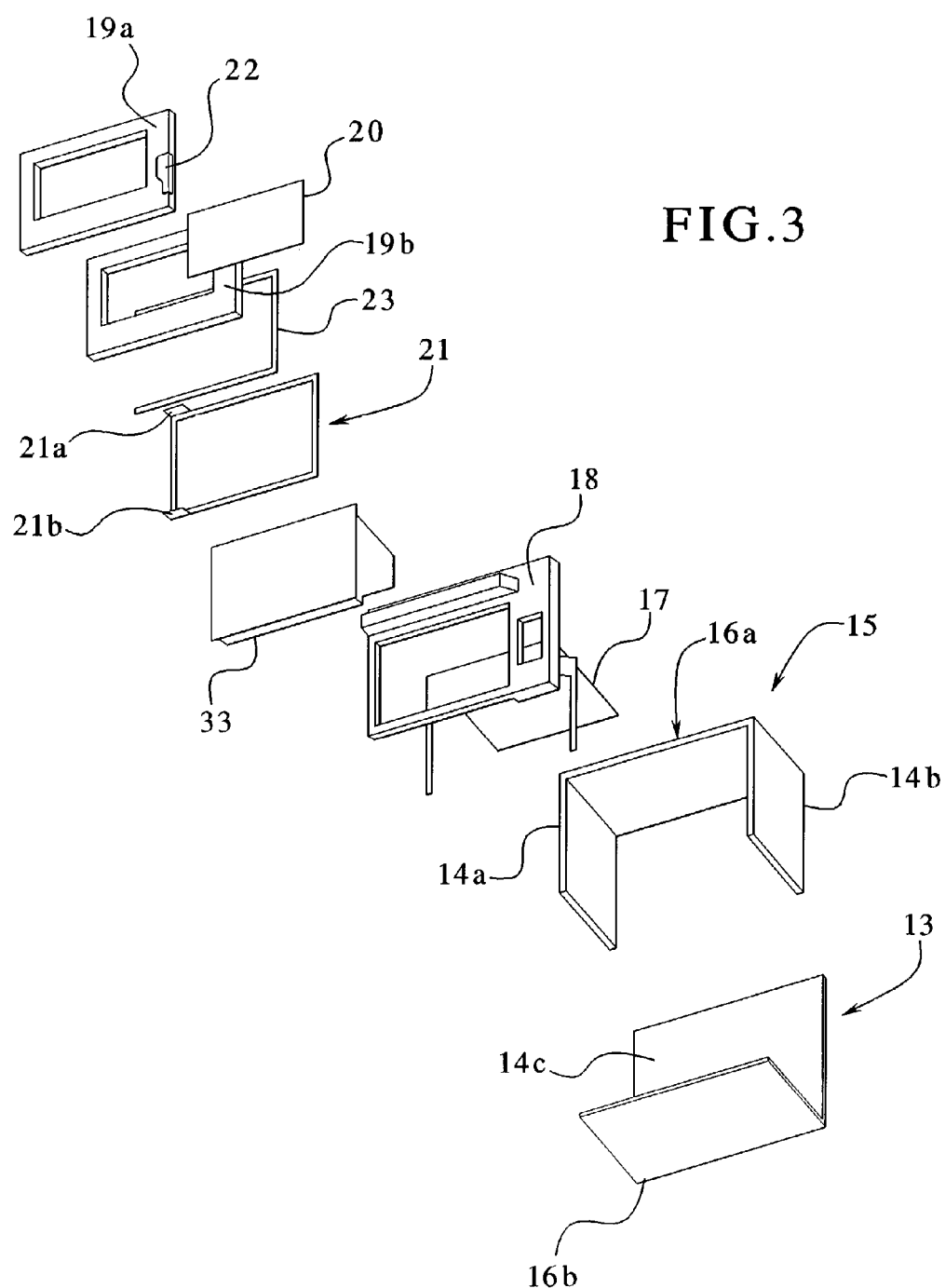
FIG. 3 is an exploded perspective view of the door, container support, bezel panel and frame of the wine or champagne preservation and dispensing apparatus of FIG. 1.

The apparatus 10 includes a housing 12 having a frame 16 with a bezel panel 18, a door 19 that is rotatably attached to the frame 16, and dispensers 24a, 24b, 24c and 24d that are connected to the front of the bezel panel. The apparatus 10 includes a container or bottle support 33 mounted inside of the frame 16 of the housing 12 to support the wine or champagne bottles 11a and 11b. The apparatus 10 includes a nitrogen or nitrogen rich gas generator 46 mounted in the housing 12 under or behind the container support 33. The nitrogen or nitrogen rich gas generator 46 draws in air, separates the nitrogen and other inert gases in the air from the oxygen and then supplies the nitrogen rich gas to a nitrogen storage container or storage tank 76 and then to the containers or bottles in the housing to provide optimal preservation of the wine or champagne. The apparatus 10 also preferably includes a cooling system 44 mounted in the housing 12, which chills or cools particular types of wine or champagne as desired. As illustrated in FIGS. 1 and 2, one embodiment of the apparatus 10 is preferably suitably sized to be placed on a counter 25, counter top or other substantially flat surface as desired by the user.

More specifically, one embodiment of the housing 12 has opposing side panels 14a and 14b, a back panel 14c, a bezel panel 18, a top panel 16a and a bottom panel 16b. The back panel 14c and the bottom panel 16b are integrally formed or otherwise attached in a conventional manner to form a chassis 13, which is the main support for the frame. Similarly, the top panel 16a and the two side panels, 14a and 14b, are integrally formed to provide the top or cover 15 of the frame. It should be appreciated that the side panels 14a and 14b, back panel 14c, top panel 16a and the bottom panel 16b may be attached in any order to assemble the frame. The chassis 13 and the cover 15 form the frame 16 of housing 12 and define the interior chamber of the housing 12. A support bracket 17 is mounted to the front of the frame 16 and bezel panel 18 is mounted to the support bracket.

The bezel panel 18 provides a decorative appearance for the front of the apparatus. The bezel panel 18 has a recessed area for mounting the door 19 so that the door is flush or even with the front surface of the bezel panel. It should be appreciated that the panels and the support bracket are preferably steel, however, any suitable material may be used in constructing the panels and support bracket. The frame 16 is the fundamental structure of the housing and protects the internal components of the housing 12. The container support 33, the nitrogen generator 46 and the cooling system 44 are mounted to or inside the frame 16 of the housing 12.

In one embodiment, the bezel panel 18 is decorated or designed using in-mold decoration to provide a decorative appearance. In-mold decoration molds or forms a design or pattern in the surfaces of the door and the bezel panel.

Therefore, several different types of designs, patterns or logos can be formed in the front surface of the door. For example, a wood grain or wood panel design can be formed to make the apparatus appear as though it was manufactured with wood. The manufacturer could also place a company logo, image, or design in the front surface of the door and/or the bezel panel. The in-mold decoration enables a manufacturer to customize the appearance of the apparatus for a wide variety of users.

The apparatus 10 includes an insulated door 19 pivotally attached to a hinge frame 21 having hinge pins 21a and 21b and preferably includes insulation in the door (not shown). The door 19 includes a front door component 19a, a rear door component 19b, a glass panel 20 and a door seal 23. The glass panel 20 is suitably secured between the front and rear door components 19a and 19b, respectively, and enables a person to view the interior chamber of the housing 12. The glass panel 20 is preferably manufactured with thermo-pane glass that maintains the interior chamber conditions, such as temperature, within the housing 12. The glass panel 20 is also preferably surrounded with insulation (not shown) and transparent so that a person may read the labels on the bottles positioned inside the apparatus 10. It should be appreciated that the panel 20 may alternatively be manufactured with any suitable plastic material or any other suitable transparent material. Furthermore, the door 19 includes a door seal 23 attached to the outside of the rear door component 19b with suitable fasteners. The door seal 23 provides a substantially air-tight seal between the door 19 and the bezel panel 18 so that the temperature inside the apparatus may be maintained at a predetermined level. It should be appreciated that the in-mold decoration method described above may be used to customize the appearance of the door. Preferably, the appearance of the door matches the appearance of the bezel panel 18. However, any combination of designs, patterns, images or logos may be used to decorate the door and the bezel panel.

The hinge frame 21 includes hinge pins 21a and 21b, which slide or screw into corresponding holes on the top and bottom of the door 19 and enable the door to rotate about the pins. The hinge frame 21 mounts to the front of the bezel panel 18 with suitable fasteners and secures the door to the bezel panel. The door 19 provides access to the interior chamber or compartment of the housing 12 and specifically, to the container support 33 and the stoppers 84 (shown in more detail in FIGS. 8 through 13).

In one embodiment, the door 19 also includes a door handle 22, which enables a user to open the door. The door handle 22 is a recessed area formed in the door 19 and enables a user to fit a hand into the recessed area to pull the door open. In one embodiment, the door seal 23 includes a magnetic strip that is positioned along the top, bottom and non-hinge sides of the frame. The magnetic strip attracts the metal surface of the hinge frame 21 and holds the door closed against the bezel panel 18. The present invention also preferably includes a poron gasket (not shown) attached to the bezel panel 18 which facilitates an even closure. Alternatively, the door 19 may include a handle that mounts to the front of the door. Furthermore, the door may include a tab 37 that engages a corresponding receptacle 38 on the bezel panel 18 that secures the door against the bezel panel. It should be appreciated that other door handles and door latching mechanisms may be used as desired by the manufacturer.

The interior chamber of the housing 12 includes a container support 33. The container support 33 has a plurality of container or bottle receptacles 34 which are integrally formed in the container support to hold bottles, and a plurality of panel slots 35 defined by the container support. The receptacles 34 on the container support 33 slope at a predetermined angle for optimal viewing of the wine or champagne bottles in the interior chamber of the housing 12. Also, the container support is preferably vacuum formed from a durable material such as plastic and is removably attached to the frame 16 in the interior chamber of the housing 12.

The plurality of container receptacles 34 formed in the container support 33 are adapted to hold various sizes and shapes of wine and champagne bottles. In one embodiment, there are four container receptacles 34 spaced equally on the container support 33. It should be appreciated that the number of container receptacles 34 may vary depending on the size and shape of the frame 16 and housing 12. Preferably at least one panel slot 35 is located between each container receptacle 34. Each panel slot 35 is adapted to receive an optional divider panel 190 (shown in more detail in FIG. 16) to separate a bottle or bottles for cooling as further described below. In one embodiment of the present invention, each receptacle 34 defines an opening 36 (see FIGS. 18 and 20) near the middle portion of the receptacles. In one embodiment, a thermoelectric cooling plate 61 (see FIGS. 21A, 21B and 21C) is positioned underneath the area or opening and a cooling transfer member cooling pad 62 is adapted to be positioned in the areas or openings to facilitate the chilling of the bottles by the cooling plate as illustrated in FIGS. 17 through 21C and discussed below.

As indicated above, the apparatus 10 includes a plurality of dispensers 24 which dispense the wine or champagne to a user; an electrical system 42, which powers components of the apparatus; a cooling system 44 for chilling bottles of wine or champagne; a nitrogen generator 46 for generating nitrogen rich gas; and other components in housing 12.

Figure 4:
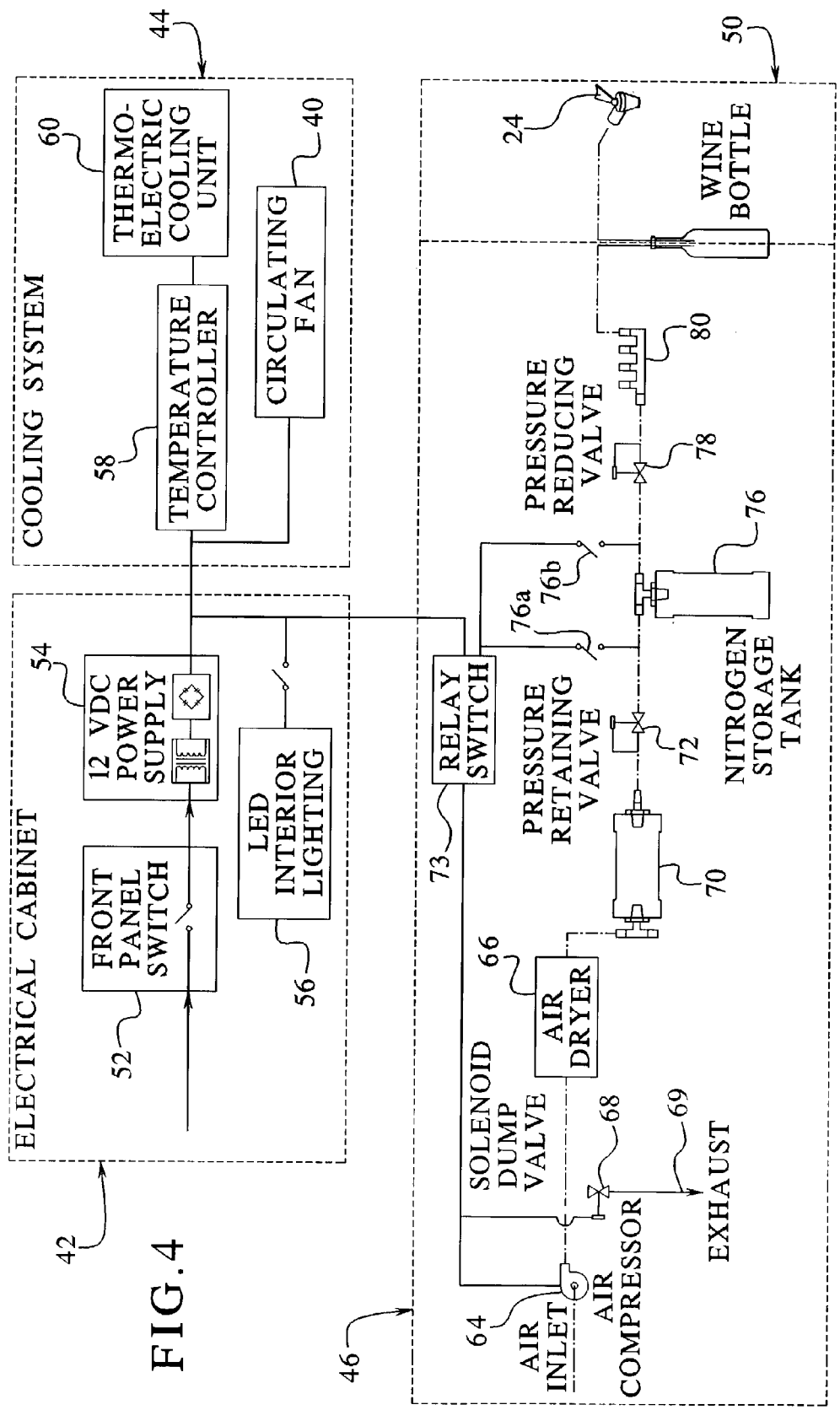
FIG. 4 is a schematic diagram of the wine or champagne preservation and dispensing apparatus of FIG. 1.
Figure 5:
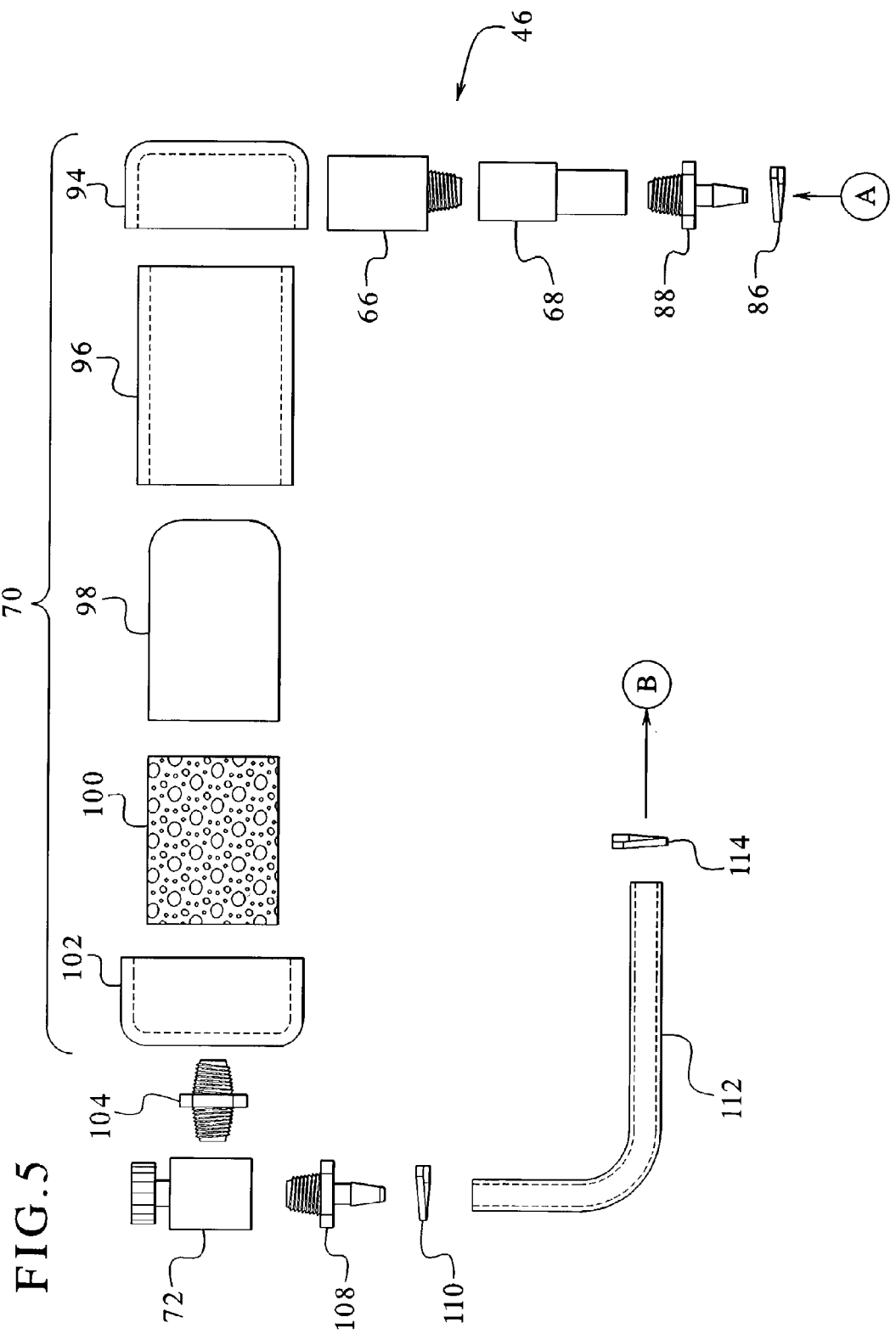
FIG. 5 is an exploded perspective view of the nitrogen generator of the apparatus of FIG. 1.
Figure 6:
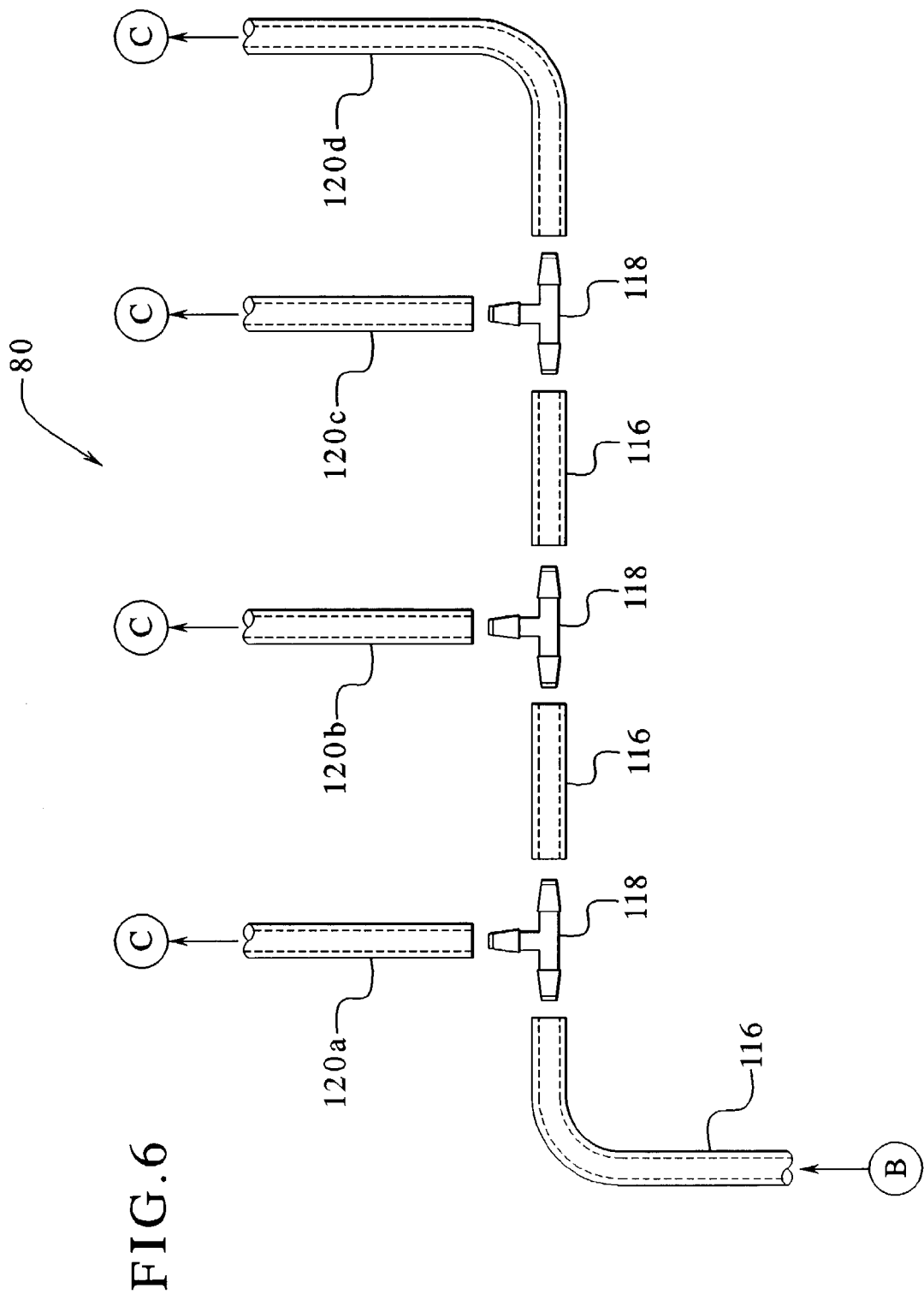
FIG. 6 is an exploded perspective view of the nitrogen gas manifold of the apparatus of FIG. 1, which distributes the nitrogen rich gas from the nitrogen storage tank to the bottles.
Figure 7:
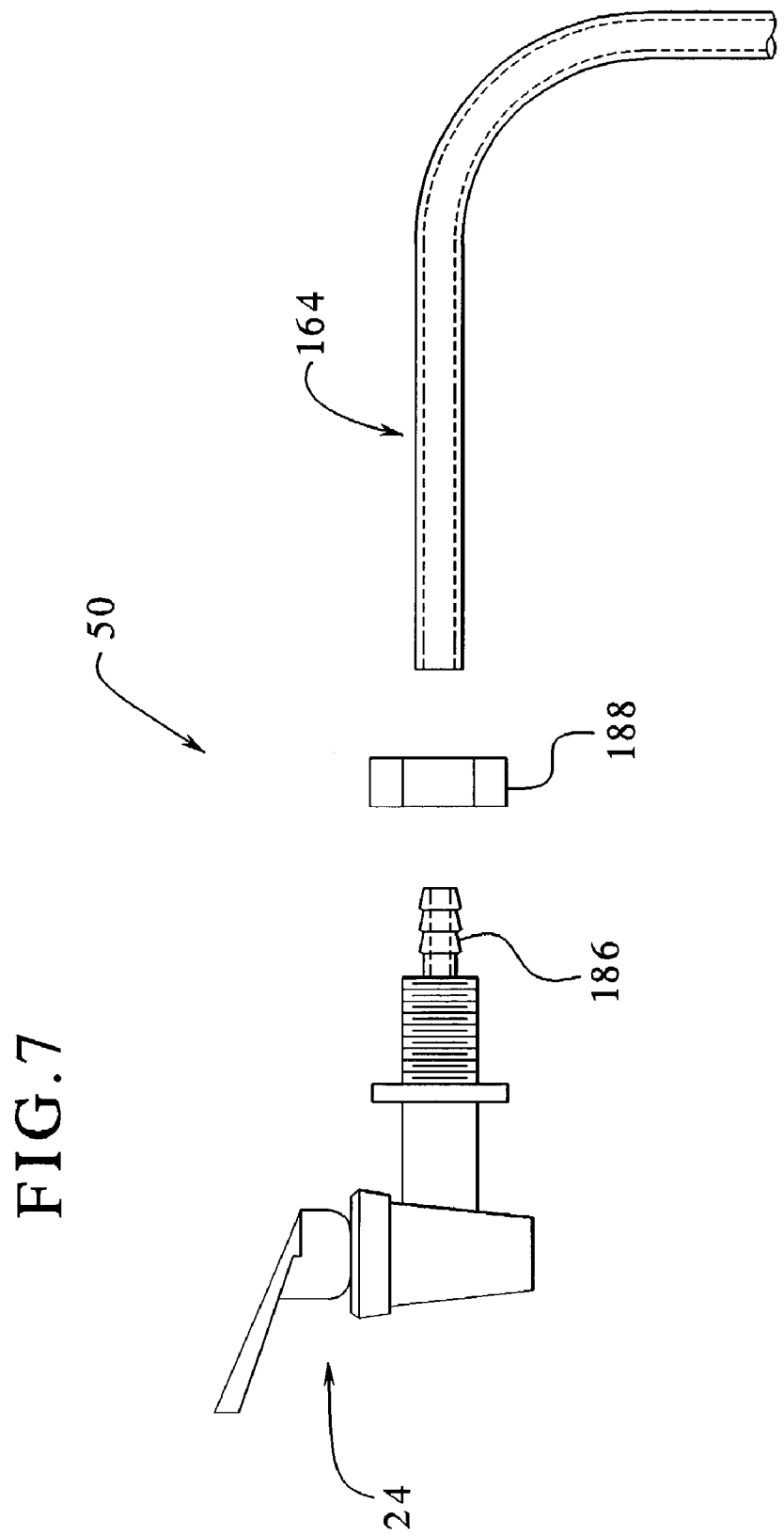
FIG. 7 is an exploded side view of a dispenser in the wine or champagne preservation and dispensing apparatus of FIG. 1.

Referring now to FIGS. 4 through 6, the nitrogen generator 46 generates nitrogen rich gas from ambient air. The nitrogen rich gas is supplied to the wine or champagne bottles via the nitrogen storage tank to displace the oxygen in the head space of the bottles (i.e., the open space above the wine or champagne inside the bottles) to limit oxidation and subsequent degradation of the wine or champagne. The nitrogen rich gas supplied to the bottles substantially reduces the oxidation process and preserves the wine and champagne for a significant period of time. This preserves the wine or champagne for subsequent use.

The nitrogen generator of the present invention can be pneumatically controlled, electro-pneumatically controlled or electrically or electronically controlled. One embodiment of the pneumatically controlled nitrogen generator is illustrated in FIGS. 4 and 5 and discussed in detail below. The nitrogen generator can be electrically or electronically controlled by conventional electric circuitry such as integrated circuits, controllers or processors. Additionally, parts of the nitrogen generator can be pneumatically controlled and parts can be electrically or electronically controlled. It should be appreciated that in the preferred embodiment, the nitrogen generator immediately begins operating when the apparatus 10 is connected to a power source.

In the embodiment of FIGS. 4 and 5, nitrogen generator 46 includes an air compressor 64 which draws ambient air into the housing 12 through a vent or other opening in the frame 16 and compresses the air. The air compressor 64 is attached to and directs the compressed air to an air dryer 66, which removes the moisture from the compressed air.

A pressure swing adsorption chamber 70 is attached to the air dryer. The dried compressed air from the air compressor 64 is supplied to the pressure swing adsorption chamber 70. A low pressure switch 76B senses the pressure in the nitrogen storage tank 76. When the low pressure switch 76B senses that the pressure inside the nitrogen storage tank 76 is below 20 psi, the switch closes and the relay switch 73 is energized. The energized relay switch 73 activates the solenoid dump valve 68 to close and activates or supplies power to the air compressor 64. The air compressor 64 supplies dried compressed air to the adsorption chamber 70 until the pressure in the chamber reaches 120 psi. Once the pressure in the chamber 70 reaches 120 psi, the pressure retaining valve 72 opens and the air in the adsorption chamber 70 passes through a carbon molecular sieve 100 having activated charcoal, which adsorbs the oxygen molecules in the compressed air. The remaining nitrogen rich gas, which includes a high concentration of nitrogen plus other inert gases, passes through the carbon molecular sieve 100 and enters the nitrogen storage tank 76. A high pressure switch 76A senses when the pressure in the nitrogen storage tank 76 reaches 110 psi. When the pressure in the nitrogen storage tank 76 reaches 110 psi, the high pressure switch 76A opens and de-energizes the relay switch 73. As a result, the air compressor 64 de-actives or shuts down and the solenoid dump valve 68 opens. Once open, the dump valve 68 vents or exhausts the oxygen molecules adsorbed by the carbon molecular sieve and returns the adsorption chamber 70 back to ambient pressure. The dump valve 68 also vents the moisture from the air dryer 66 out of the apparatus through the exhaust 69, which dries the dessicant in the dryer.

If the pressure of the dried compressed air inside the adsorption chamber 70 becomes too high, a high pressure relief valve (not shown) opens and releases the excess pressure to the atmosphere. The nitrogen storage tank 76 is attached to the adsorption chamber 70 and is adapted to store the nitrogen rich gas under the necessary pressure until it is needed. It should be appreciated that any reasonable pressure limits may be used to control the supply of nitrogen rich gas in the apparatus 10.

The pressure of the nitrogen rich gas is preferably reduced by a pressure controller such as pressure reducer 78 (illustrated in FIG. 4) because the nitrogen rich gas stored in the nitrogen storage tank 76 is at an elevated pressure, which is greater than the upper pressure limits of the bottles. The pressure reducer 78 decreases the pressure of the nitrogen rich gas from approximately 120 psi to approximately 5 psi for wine bottles. A manifold 80 (illustrated in FIGS. 4 and 6) is connected to the pressure reducer 78 and is adapted to distribute the nitrogen rich gas to the bottle or bottles.

FIG. 5 specifically illustrates one embodiment of the nitrogen generator 46 including individual parts to provide a further detailed description of how one embodiment of the nitrogen generator of the present invention operates. Compressed air enters the nitrogen generator through suitable tubing at "A" as indicated by the arrow in FIG. 5. The tubing is attached to the barbed end of a nylon fitting 88 and is secured to the fitting with a suitable hose clamp 86. The nylon fitting 88 has a male threaded end that screws into a female threaded receptacle on solenoid dump valve 68. The dryer assembly 66, which dries the compressed air, has a male threaded end that screws into a corresponding female threaded receptacle on the solenoid dump valve 68 and is attached to a cap 94 on the other end of the assembly.

The pressure swing adsorption chamber 70 of the nitrogen generator includes end caps 94 and 102, a pipe 96, a nylon mesh bag 98 and an activated carbon molecular sieve 100. The carbon molecular sieve 100 traps the oxygen molecules in the compressed air as the compressed air passes through the sieve. The sieve 100 is fitted into a nylon mesh bag 98, which holds the activated charcoal granules together. The pipe 96 is closed on both ends by caps 94 and 102.

One end of the adsorption chamber includes the dryer which has male threaded members to attach to the cap 94 and the solenoid dump valve 68. The dump valve 68 opens to release the oxygen molecules trapped by the oxygen adsorbing member or carbon molecular sieve and any excess pressure from the adsorption chamber 70 to the atmosphere. A dual threaded male nylon fitting 104 screws into cap 102 on the other end of the adsorption chamber. The nylon fitting 104 screws into a corresponding female threaded receptacle in the pressure retaining valve 72. The pressure retaining valve 72 controls the supply of nitrogen to the nitrogen storage tank 76. When the pressure in the adsorption chamber 70 reaches the predetermined set-point of the pressure retaining valve 72, the retaining valve 72 opens to supply the nitrogen rich gas to the nitrogen storage tank 76, while maintaining a constant pressure in the adsorption chamber 70.

A nylon fitting 108 having a barbed end and a male threaded end screws into the pressure retaining valve 72. Suitable tubing or a gas communication line 112 is attached to the barbed end of the fitting 108 and is secured with a suitable hose clamp 110. The hose clamp 110 prevents the tubing 112 from slipping off of the barbed end of the fitting 108. A suitable hose clamp 114 also holds the other end of the tubing 112 onto the nitrogen storage tank 76.

In operation, the compressed air enters the nylon fitting 88 at point "A." The air passes through fitting 88 and into dryer assembly 66 which contains a desiccant such as silica. The dryer assembly or air dryer 66 may be any suitable commercially available dryer. The desiccant adsorbs the moisture in the compressed air. The resultant dried compressed air exits the dryer assembly 66 and enters the adsorption chamber 70. In another embodiment, the dryer assembly is a separate unit that is connected to the adsorption chamber 70 via suitable tubing. In still another embodiment, the nitrogen generator 46 includes both a separate dryer unit and a dryer assembly 66 attached to the adsorption chamber 70 for drying the compressed air. Also, it should be appreciated that the desiccant used to dry the compressed air may be any suitable desiccant.

The dried compressed air enters the adsorption chamber 70 through cap 94. The dried air then passes through the nylon mesh bag 98 and over the carbon sieve 100. The carbon sieve includes activated charcoal that has very fine pores to promote the adsorption of the oxygen molecules from the air. The activated charcoal may be any suitable activated charcoal material such as Activated Charcoal #162 supplied by Takeda Chemical Industries. During the carbon adsorption process, the oxygen molecules diffuse at a higher rate into the narrow gaps of the carbon pore system and the nitrogen molecules and the other gases in the air diffuse at a lower rate into the carbon pores. Therefore, at optimized pressure, temperature, time and diffusion lengths, the majority of the oxygen molecules are removed from the air and the nitrogen molecules pass by the carbon sieve. When the pressure in the adsorption chamber 70 reaches 120 psi, the pressure retaining valve 72 opens. The nitrogen rich gas then passes through the pressure retaining valve 72, through nylon fitting 108 and tube 112 to the nitrogen storage tank 76 (shown in FIG. 4). Preferably, when the pressure in the nitrogen storage tank reaches 110 psi, the dump valve 68 opens, which enables the oxygen molecules to exhaust to the atmosphere through a vent (not shown) in one side of the housing 12. It should be appreciated that the concentration of the oxygen that is released back into the atmosphere is not high and within the safe limits established for household and commercial products.

When nitrogen rich gas is required to replace air in the head space of the wine bottles in the apparatus 10, the nitrogen rich gas is released from the nitrogen storage tank 76 through suitable tubing to the manifold 80 shown in more detail in FIG. 6. The manifold 80 disperses the nitrogen rich gas to each of the four stoppers (shown in FIGS. 8 through 13) in each bottle as discussed in greater detail below. The manifold preferably includes suitable tubing or fluid communication lines 116 and nylon tees 118. The tubing 116 fits over or overlaps the barbed ends of each tee. The barbed ends of the nylon tees fit securely into the tubing so that the tubing is prevented from slipping off of the tees. The nitrogen rich gas enters the interior space defined by the outer wall of the tubing 116 at point B and passes through each of the tubing lines 120a, 120b, 120c and 120d that extend from the tees 118. The tubing or fluid communication lines 120a to 120d transport the nitrogen rich gas to the stoppers 84. It should be appreciated that while nitrogen is preferred due to the volume of nitrogen in the air, other suitable inert gases may be generated to preserve the wine or champagne.

Referring back to FIGS. 1 through 4, the apparatus 10 includes a cooling system 44 which cools or chills one or more bottles of wine or champagne. It should be appreciated that the cooling system of the present invention can be controlled by a user (i.e., using a switch or temperature control), pneumatically controlled, electro-pneumatically controlled or electrically or electronically controlled. In one embodiment, the cooling system 44 includes a circulating fan 40 that circulates cooled air around the interior chamber of housing 12, and thereby cools or chills the wine or champagne bottles to a specific temperature desired by the user. The temperature of the cooled air is less than room or ambient temperature. In one embodiment, the cooling system turns on automatically when the apparatus is plugged into a conventional outlet. In one embodiment, a control device 30b is employed to turn on the cooling system.

In the second alternative embodiment, the control 30b enables a user to input a desired cooling temperature for the interior chamber of the housing 12. The cooling temperature selected by the user is communicated from the control device (not shown) to a temperature controller 58, which turns on or activates a thermoelectric cooling unit 60 until the desired temperature is achieved in the housing. For example, a temperature sensing device, such as a thermocouple or thermometer (not shown) may be employed to sense the interior chamber temperature of housing 12. If the interior chamber temperature of the housing 12 is above the desired temperature, the temperature controller 58 signals the thermoelectric cooling unit 60 to provide cooled air to the interior chamber of housing 12. A circulating fan 40 circulates the cooled air from the cooling unit 60 around the interior chamber of the apparatus 10. The thermoelectric cooling unit 60 and fan 40 continue to provide cooled air to the interior chamber of housing 12 until the desired temperature is achieved. At that point, the temperature controller signals the cooling unit 60 and fan 40 to shut off.

Figure 21A:
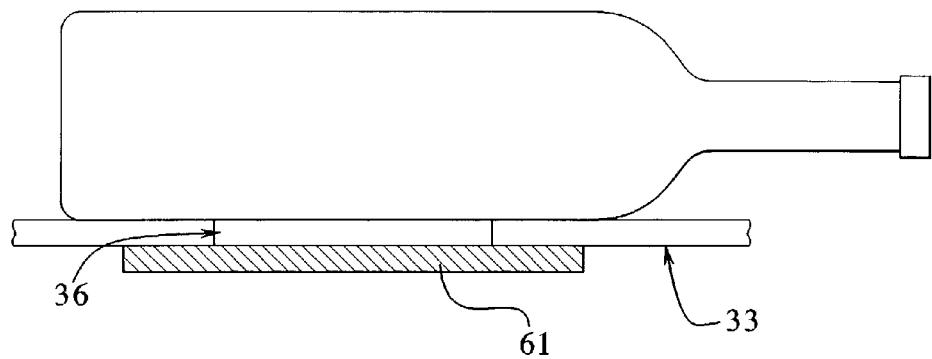
FIG. 21A is a side elevation view of a bottle positioned above an area or opening in a fragmentary portion of the container support where a cooling transfer member or cooling pad is removed from the top of a cooling plate for maintaining the temperature of a bottle at the ambient temperature.
Figure 21B:
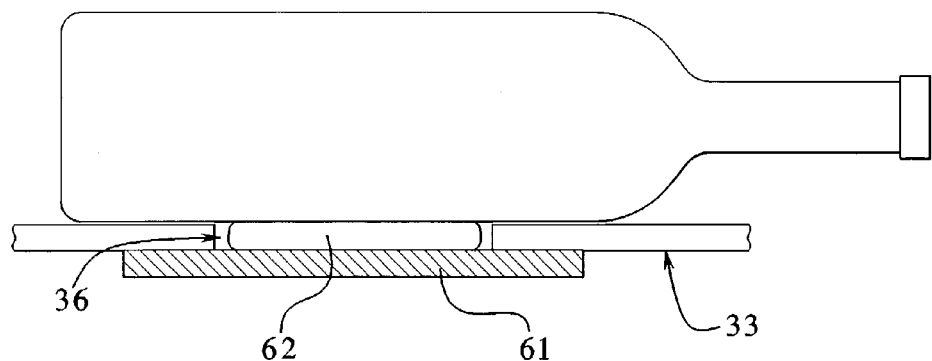
FIG. 21B is a side elevation view of a bottle positioned above an area or opening in a fragmentary portion of the container support where a cooling transfer member or cooling pad is placed completely in the area or opening above and adjacent to the top of the cooling plate for chilling the bottle to the maximum chill temperature of the cooling plate.
Figure 21C:
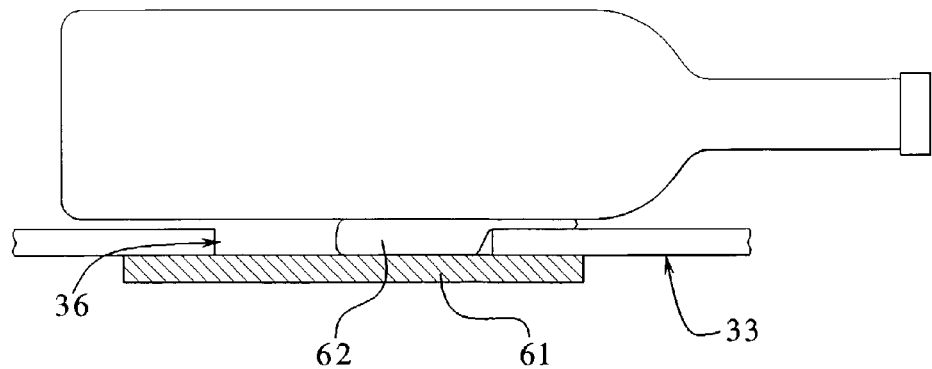
FIG. 21C is a side elevation view of a bottle positioned above an area or opening in a fragmentary portion of the container support where a cooling transfer member or cooling pad is placed in different position in the area or opening above and adjacent to the top of a cooling plate for chilling the bottle to a desired temperature.

Referring now to FIGS. 17 through 21C, another embodiment of the present invention is illustrated where the cooling system 44 includes a thermoelectric cooling member or plate 61, which is attached or positioned underneath the areas or openings 36 located in the container receptacles 34. It should be appreciated that more than one cooling member or plate 61 may be used. The cooling member or plate 61 includes a cold top area or surface, which is closest to the wine or champagne bottles, and a warm bottom surface. A cooling transfer member or cooling pad 62 such as a Gel-Pak manufactured by LIFOAM, Inc., is placed between the thermoelectric cooling member or plate 61 and the corresponding bottles located above the cooling plates as illustrated in FIGS. 21B and 21C. The cooling member or plate 61 provides a cold top surface or area and releases heat from the bottom surface. The heat is dissipated through vents (not shown) and possibly using a fan (not shown) located in the housing 12. The cooling transfer member or cooling pad 62 rests on top of the cooling member or plate in the area or opening 36 of the container support 33. The cool temperature from the cold top area or surface of the cooling plate is transferred to the cooling transfer member or cooling pad 62 and then to a wine or champagne bottle. In this manner, the bottles can be cooled or chilled to a preferred temperature as described below. Alternatively, an optional suitable temperature control device may communicate with the cooling member or plate 61 and cool or chill a bottle to a specific temperature as desired.

FIGS. 21A through 21C illustrates one embodiment of the present invention where the use of and positioning of the cooling transfer member or cooling pad 62 in area or opening 36 above the cooling plate 61 controls the temperature of a wine bottle. The wine bottle is positioned on the container support 33 adjacent to the area or opening 36 in the container support. If a user does not want to chill a bottle of wine such as with most red wines, the user does not place or position the cooling transfer member or cooling pad 62 in the area or opening 36 (as illustrated in FIG. 21A). Without the cooling transfer member or the cooling pad 62, the temperature of the cold top surface of the cooling member or plate does not transfer to the wine bottle. Therefore, the temperature of the wine bottle remains at or approximately at ambient temperature.

The temperature of the wine bottle depends on how much of the cold temperature of the cooling plate 61 is transferred to the bottle by the cooling transfer member or cooling pad 62. Therefore, to fully or completely chill a wine bottle, the entire cooling transfer member or cooling pad 62 must contact the cooling plate and the wine bottle as illustrated in FIG. 21B. A wine bottle may be chilled to other desired temperatures between the ambient temperature and the maximum chill temperature of the cooling plate 61 by changing the position of the cooling transfer member or cooling pad 62. In FIG. 21C, only part of the cooling transfer member or cooling pad 62 is contacting the cooling plate 61 and the bottle. Therefore, the wine bottle will be chilled or cooled to a temperature between the maximum chill temperature and the ambient temperature in the apparatus. Other desired temperatures can be achieved by changing the position and thereby the amount of contact between the cooling transfer member or cooling pad 62, the cooling plate 61 and the bottle.

It should be appreciated that other suitable cooling systems may be used to cool or chill the wine or champagne bottles in the apparatus. For example, the thermoelectric cooling plates 61 and one or more circulating fans 40 can be employed in the cooling system 44. In this example, a cooling plate is attached or positioned underneath the container support 33. The cooling plate or plates 61 generate a cold top surface as described above. The circulating fan, which is preferably attached adjacent to the container support 33, such as along side, beneath, behind or above the support, circulates air over the cooling plate or plates. The air is cooled by convection as the air crosses over and contacts the cold top surface of the cooling plate. The cooled air is circulated by the circulation fan and cools the bottles in the interior chamber of the apparatus. It should be further appreciated that any combination of the cooling plates 61, cooling transfer members or cooling pads 62 and one or more circulating fans 40 may be used in the cooling system 44.

The apparatus 10 also includes an electrical system 42 which provides power to the cooling system 44, the nitrogen generator 46, interior lighting 56 and other components located in the interior chamber of the housing 12. Referring to FIGS. 1 through 4, electricity is supplied to the apparatus 10 from a conventional electrical outlet 28 through a suitable electrical cord 26. Preferably, the apparatus includes a light button 30a, which turns the interior lighting on or off, and a chill button or control device 30b, which controls the cooling system 44. The apparatus is preferably automatically turned on by plugging the apparatus into a conventional electrical outlet which supplies electricity to power supply 54. Alternatively, when a switch 52 (see FIG. 4) is opened, the apparatus 10 is off and when the switch is closed, the system is on. Power supply 54 energizes and supplies electricity to the other components in apparatus 10. The interior chamber lights 56 are turned on or off by pressing the "lamps" button 30a. The interior chamber lighting 56 illuminates the interior chamber of the housing 12 so that a user is able to read the labels on the bottles in the interior chamber.

Referring now to FIGS. 1 through 4 and 7, the apparatus 10 includes a plurality of dispensers such as spigots or faucets, 24a, 24b, 24c and 24d, mounted on the front of the frame 16, and specifically to the bezel panel 18 of housing 12. The dispensers enable a user to dispense wine or champagne from bottles in the interior chamber of housing 12. While the apparatus 10 includes four dispensers, it should be appreciated that any number of dispensers may be used in the apparatus 10 depending on the size of the housing 12. Each dispenser 24a, 24b, 24c and 24d is preferably positioned over a container receptacle 34 in the container support 33, where each container receptacle 34 supports a bottle. This enables a user to easily select a wine or champagne bottle and to activate the dispenser corresponding to the desired wine or champagne in the selected bottle. It should be appreciated that the dispensers 24a through 24d may be any suitable dispensers.

The body of each dispenser 24 is placed through corresponding openings in the bezel panel 18 of the preservation and dispensing apparatus 10 and screwed into a nut 188, which is on the opposite side of the bezel panel, until the dispenser is flush against the bezel panel 18. The nuts 188 secure the dispensers in place on the bezel panel 18. The transport tubes 164 are attached to the barbed ends 186 of the dispensers. The barbed end provides a tight and secure fit to the transport tubes so that the transport tubes do not slip off of the dispensers 24a to 24d.

Referring now to FIGS. 8 through 13, the apparatus 10 includes a plurality of stoppers 84, and specifically a stopper for each of the four bottles that may be preserved in apparatus 10. Each stopper 84 attaches to a bottle to provide an air-tight seal in the opening of each bottle and to enable nitrogen gas to flow into the bottles and liquid to flow out of the bottles to the dispensers 24a to 24d.

The stopper 84 includes a communication member 122a and a sealing member 122b. The communication member 122a is attached to the gas or nitrogen supply communication line or tubing and to the fluid communication lines or tubing connected to the dispensers 24a to 24d. The sealing member 122b is inserted into the opening of a bottle (i.e., similar to the way a cork fits into a bottle opening). The communication member 122a is removably attachable to the sealing member 122b. If the communication and sealing members 122a and 122b are separated or disconnected from each other, the communication member 122a remains sealed to prevent the nitrogen rich gas from leaking out of the communication member. The individual parts of the communication and sealing members 122a and 122b, respectively, are shown in more detail in FIGS. 9 to 13 to describe how the parts interrelate and operate within each stopper 84.

The communication member 122a includes a top plate 124, two barbed locking arms 125, stop valve spring 128, stainless steel check ball or sealer 130, o-ring 132 and upper body 134 having gas inlet port 136 and liquid outlet port 137, disconnect gas probe 138, disconnect liquid probe 139 and o-rings 140.

The sealing member 122b includes a lower body 142, bottom plate 150 that is permanently secured to the lower body, flanged rubber stopper 156 and transport tube 164. The lower body 142 has a liquid port 144, gas port 146, two lock receivers 147 and two lock slots 148. The bottom plate 150 of the lower body includes a liquid port 151, stop valve actuator post 152, one or more nitrogen ports 155 and an outer rim 154. The flanged rubber stopper 156 has a rubber flange 158, outlet port 160 and a flanged stem 162. A transport tube 164 transports the liquid from the bottles to the stopper. The transport tube 164 includes an upper draft tube 166 and end tube 168.

The top plate 124 is permanently secured to the upper body 134. Locking arms 125 are integrally molded to the top plate 124 and slide into the corresponding channels 135 on upper body 134 to secure the top plate and upper body 134 to the sealing member 122b. The tabs 126 located on each locking arm 125 are received by the corresponding lock receivers 147 on the lower body 142 and the tabs 126 engage the lock slots 148. When the tabs 126 engage lock slots 148, the top plate 124 is secured in place on top of the upper body 134 and to lower body 142.

Figure 9:
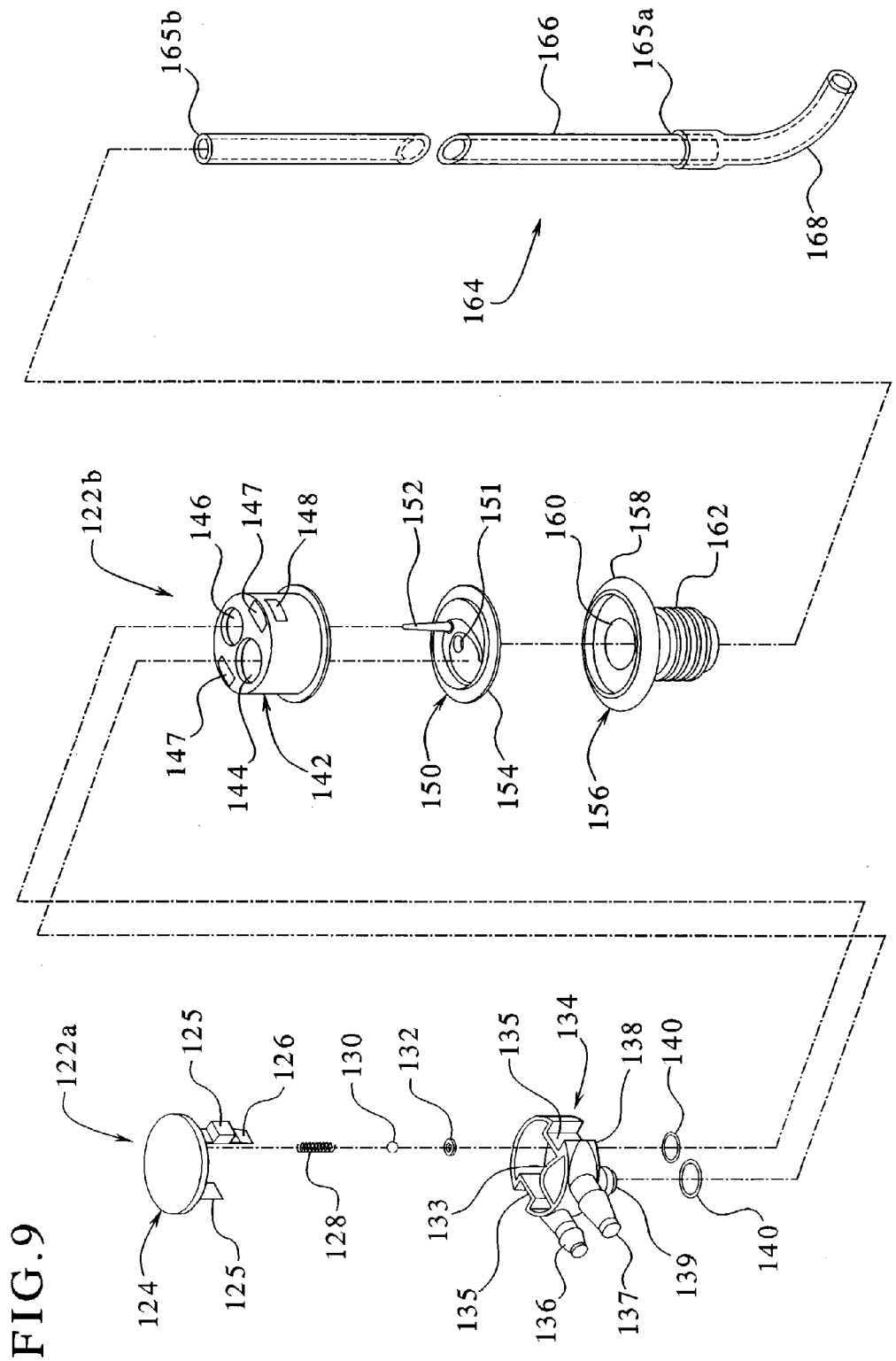
FIG. 9 is a further exploded perspective view of the stopper of FIG. 8.
Figure 10:
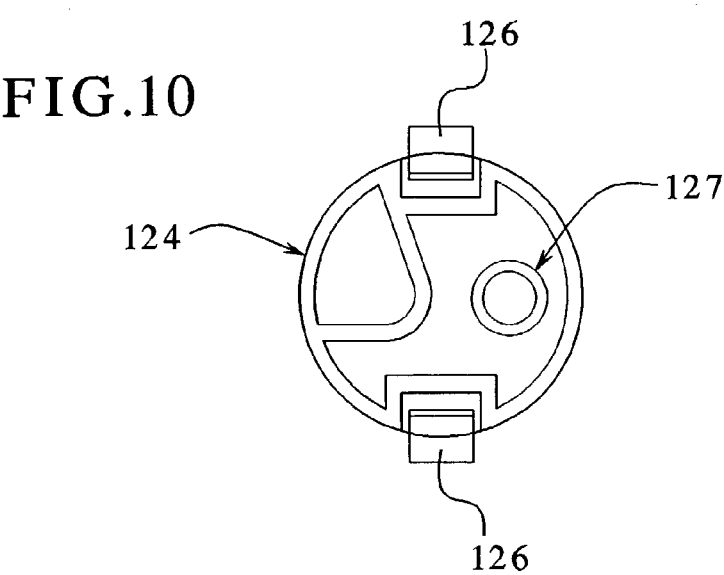
FIG. 10 is a bottom view of the top plate that is attached to the top of the communication member of the stopper of FIG. 8.
Figure 11:
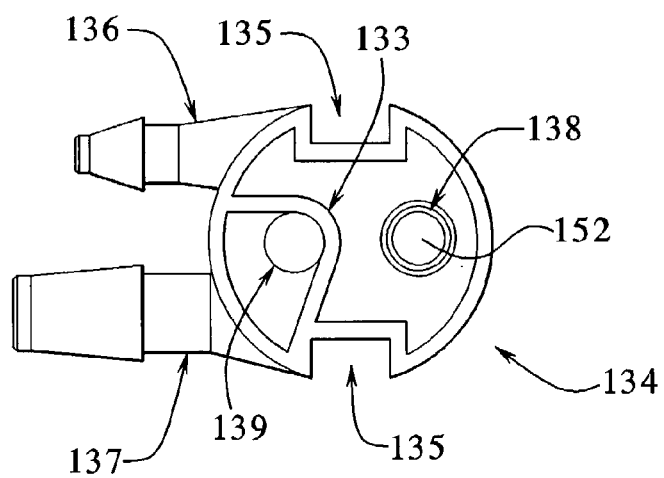
FIG. 11 is a bottom view of the communication member in the stopper of FIG. 8.

The stop valve spring 128, stainless steel check ball 130 and o-ring 132 are positioned inside the upper body 134 and in-line with the gas port 146 on the lower body 142. As shown in FIGS. 9 and 10, the spring 128, check ball 130 and o-ring 132 are kept in place by guide tube 127. The guide tube 127 is integrally formed with top plate 124 and extends downward from underneath the top plate 124. To securely fit over the spring 128, check ball 130 and o-ring 132, the guide tube 127 has a diameter that is slightly smaller than the largest diameter of the spring 128, ball 130 or o-ring 132. As the top plate 124 is placed onto the upper body 134, the guide tube 127 slides over spring 128, ball 130 and o-ring 132, thereby locking these three components in place. Although these three components are stationary, the spring 128 and check ball 130 can move up and down freely within the guide tube 127.

The bottom plate 150 is permanently secured to the lower body 142. Additionally, the bottom plate 150 is secured to the flanged rubber stopper 156 by placing the bottom plate 150 on top of the rubber stopper 156. The circular rubber flange 158 slides over the outer rim 154 of the bottom plate 150, which joins the bottom plate of the lower body 142 to the rubber stopper 156 and provides an air-tight seal between the bottom plate of the lower body and the stopper. Furthermore, the upper body 134 and the lower body 142 are secured together by locking arms 125, tabs 126 and lock slots 148 so that the stop valve actuator post 152 is aligned directly below and in the center of gas port 146. The upper body 134 can be released from the lower body 142 by pressing tabs 126 inward and pulling the upper and lower bodies apart.

Figure 12:
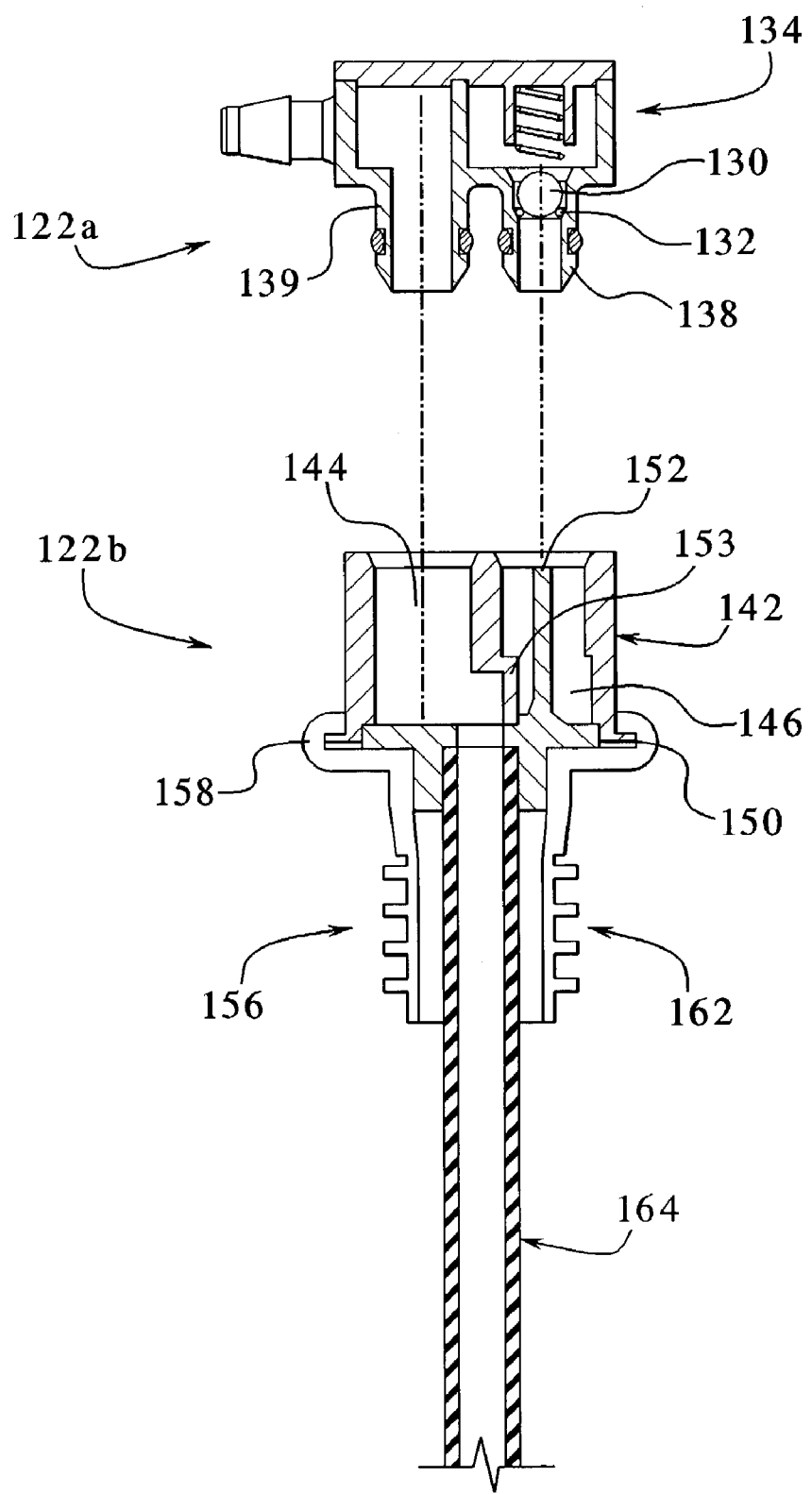
FIG. 12 is a cross-sectional view of a stopper taken substantially through line 12—12 of FIG. 8 illustrating the connection of the communication member to the sealing member of the stopper of FIG. 8.

An end 165a of the upper draft tube 166 is connected to the end tube 168. The end tube 168 has a slightly larger inside diameter than the upper draft tube 166 so that the end tube fits securely over the upper draft tube end 165a as illustrated in FIG. 9. The end tube 168 is curved to reach the lowest interior points of the bottles so that all of the liquid inside of the bottles is dispensed to the user. The other end 165b of the draft tube 166 is inserted into the bottom of the outlet port 160 and passes through the middle portion of the stopper 84 to the liquid port 144 of the lower body 142. As shown in FIG. 12, a separator wall 153 separates the liquid port 144 from the gas port 146 inside the lower body 142. Therefore, the liquid that passes through the transport tube 164 into the lower body 142 does not mix with the gas that passes through gas port 146.

Figure 14:
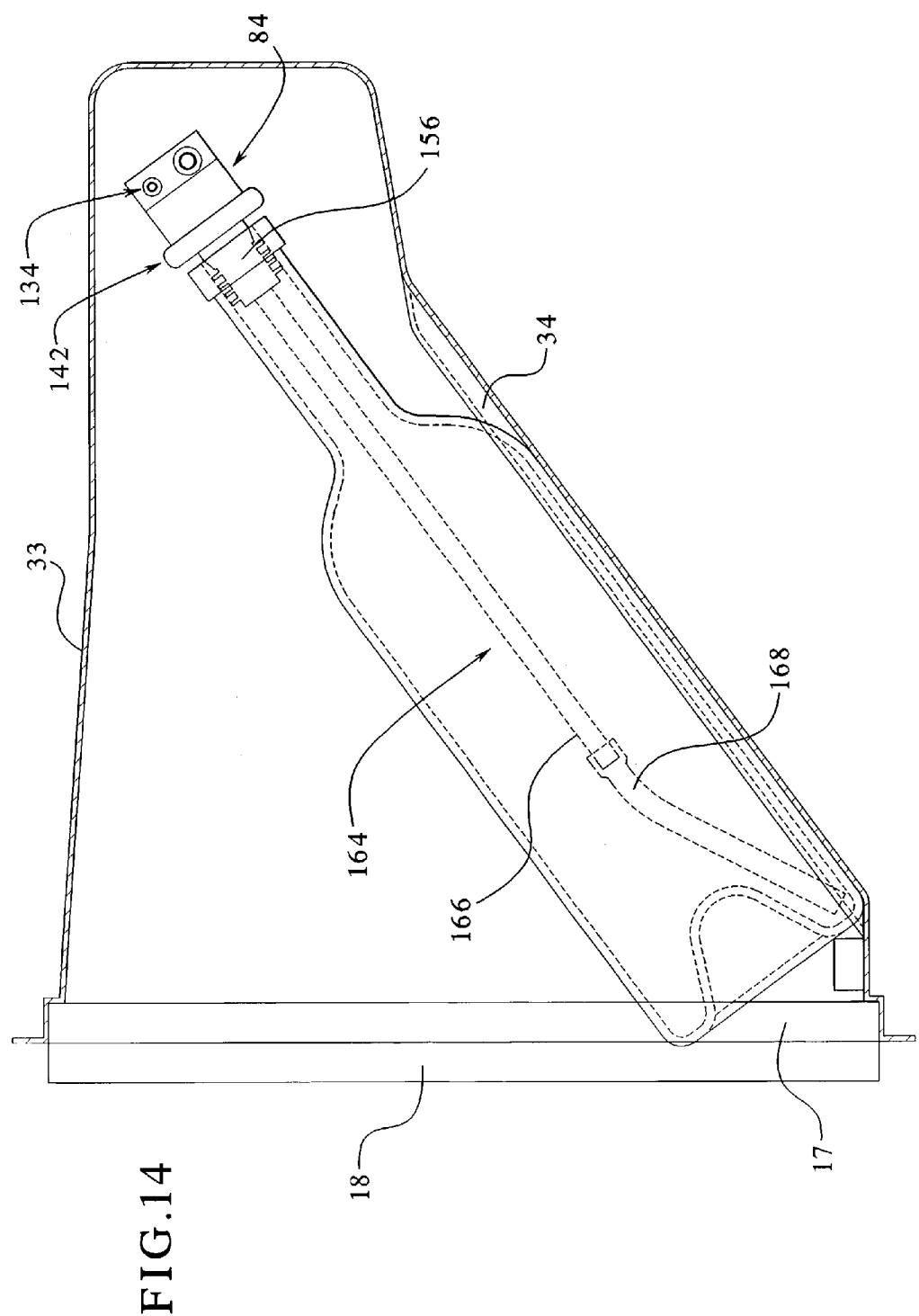
FIG. 14 is a cross-sectional view taken along a portion of line 14—14 in FIG. 1 illustrating a bottle positioned on the container support of the apparatus.

In operation, the sealing member 122b is placed securely into a bottle that contains wine or champagne by inserting the flanged stem 162 of the rubber stopper 156 into the bottle opening. The annular flanged rings located on the flanged stem press against the inside walls of the opening to seal the interior chamber of the bottle from the outside ambient air. As the flanged stem 162 is inserted into the bottle opening, the transport tube 164 is also inserted down through the bottle opening and into the liquid inside the bottle. The bottle or sealing member 122b rotates so that the end tube 168 on the transport tube 164 is located in the lowest point of the interior chamber of the bottle (as illustrated in FIG. 14).

The gas inlet port 136 on the communication member 122a is connected to tubing or gas communication line that extends from the nitrogen generator 46. Similarly, the liquid outlet port 137 is connected to tubing or liquid communication line that extends between the liquid outlet port 137 and one of the dispensers 24a to 24d. The tubing is secured to the barbed ports 136 and 137 by hose clamps or any other suitable device. After the communication member 122a is secured to the tubing, the bottom of the communication member is placed on the top of the sealing member 122b, which is firmly secured in the bottle opening.

O-rings 140 are placed onto the disconnect gas probe 138 and the disconnect liquid probe 139 and the probes are inserted into corresponding liquid port 144 and gas port 146 on the lower body 142. The o-rings 140 and annular flanges on the probes provide an air-tight seal between the probes of the communication member 122a and the sealing member 122b.

As the gas probe 138 is inserted into the gas port 146, the stop valve actuator post 152 extends through the center of the gas probe 138 and against the bottom of the check ball 130. The length of the actuator post 152 is predetermined so that the actuator post 152 is of a sufficient length to extend through the gas probe 138 and push the check ball 130 upwards against the valve spring 128 and away from the o-ring 132. Once the check ball 130 is pushed upwards away from the o-ring 132, the seal established between the ball and the o-ring is broken, thereby enabling the nitrogen rich gas to pass through the gas port 146 and into the gas probe 138.

When the sealing member 122b is disconnected or removed from the communication member 122a, the pressure of the actuator post 152 on the check ball 130 is gradually released as the post moves downward away from the ball. At the same time, the valve spring 128 pushes against the top of the check ball 130 inside the guide tube 127. The spring biases or forces the check ball 130 to move downward and into the o-ring 132, which seals the gas port opening into the gas probe 138. Therefore, the gas inlet line attached to the communication member 122a can remain attached to the upper unit because the check ball 130 and o-ring seal prevents any gas from escaping. It should be appreciated that the valve spring 128 is sized and designed to provide a sufficient amount of force to the top of the check ball 130 so that the check ball 130 maintains the seal between the ball 130 and the o-ring 132.

Once the communication member 122a is attached to the sealing member 122b, the actuator 152 presses against the check ball 130 and enables the nitrogen rich gas generated by the nitrogen rich gas generator to flow through the stopper. The nitrogen rich gas flows into the gas probe 136 via suitable tubing that extends from the nitrogen gas manifold (as illustrated in FIG. 6). The nitrogen rich gas enters the stopper assembly at 5 psi to provide a steady stream of wine through the dispensers to a user, to provide positive pressure and to prevent carbonation of the wine or champagne. The nitrogen rich gas travels through the gas probe 136 into a chamber inside the upper body 134. The upper body 134 is separated into two chambers by a wall 133 thereby preventing the mixing of the nitrogen rich gas and the liquid inside the upper body 134.

Figure 13:
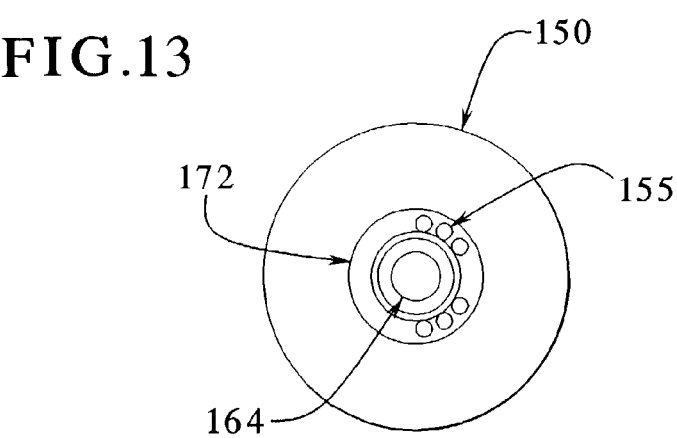
FIG. 13 is a bottom view of a bottom plate that attaches to the bottom of a sealing member of the stopper of FIG. 9.

The nitrogen rich gas fills the chamber and flows underneath the check ball 130 into the gas probe 138. The gas then fills the gas chamber 146 in the lower body 142. Referring to FIGS. 12 and 13, the nitrogen rich gas flows through the bottom plate 150. The bottom plate has annular gas slots 172 located in the gas chamber 146 of the lower body 142. The nitrogen rich gas, therefore, flows through the gas slots 172 in the bottom plate 150. The gas travels through the center of the stopper stem 162 and outside of the transport tube 164 down into the bottle. The nitrogen rich gas dilutes the ambient air, and particularly the oxygen, that is found in the head space of the bottle and significantly decreases the degradation of the wine or champagne due to the continued presence of additional oxygen in the head space.

The compressed nitrogen rich gas in the bottles also promotes the transport of the wine or champagne from the bottles to the dispensers. Because the pressure inside the bottles is higher than the ambient pressure outside the bottles, a suction effect is produced anytime an opening is created in the dispensing system. Therefore, when a valve is opened in a dispenser, the high pressure of the system wants to equalize with the low ambient pressure outside the apparatus 10. Since the pressure of the nitrogen rich gas is maintained at a constant level inside the bottles, pressure equalization will occur whenever a dispenser valve is opened. The pressure equalization provides a suction effect inside the system so that the liquid inside the bottles is drawn out of the bottles and travels through the transport tube 164 to the dispensers.

Once a dispenser valve is opened, the liquid inside the bottles flows up through the transport tube 164 and into the liquid chamber 144 of the lower body 142. The liquid then flows into the liquid probe 139, through the upper body 134 and into the liquid port 137. From the liquid port 137, the liquid flows through the tubing to the dispenser and into the glass of a user. Once the dispenser valve is closed, the suction effect ceases and the wine discontinues its flow from the bottle to the dispenser. Furthermore, any of the dispensers may be held open after a bottle is empty to fill the transport tubes and associated tubing with nitrogen rich gas and purge wine residue from the system. This process ensures that a new replacement bottle will not be contaminated by oxygen or wine residue that remains in the dispensing system. However, it should be appreciated that the entire dispensing system is sealed so that no air enters the bottles from the dispensers and no wine leaks from the system.

Figure 15:
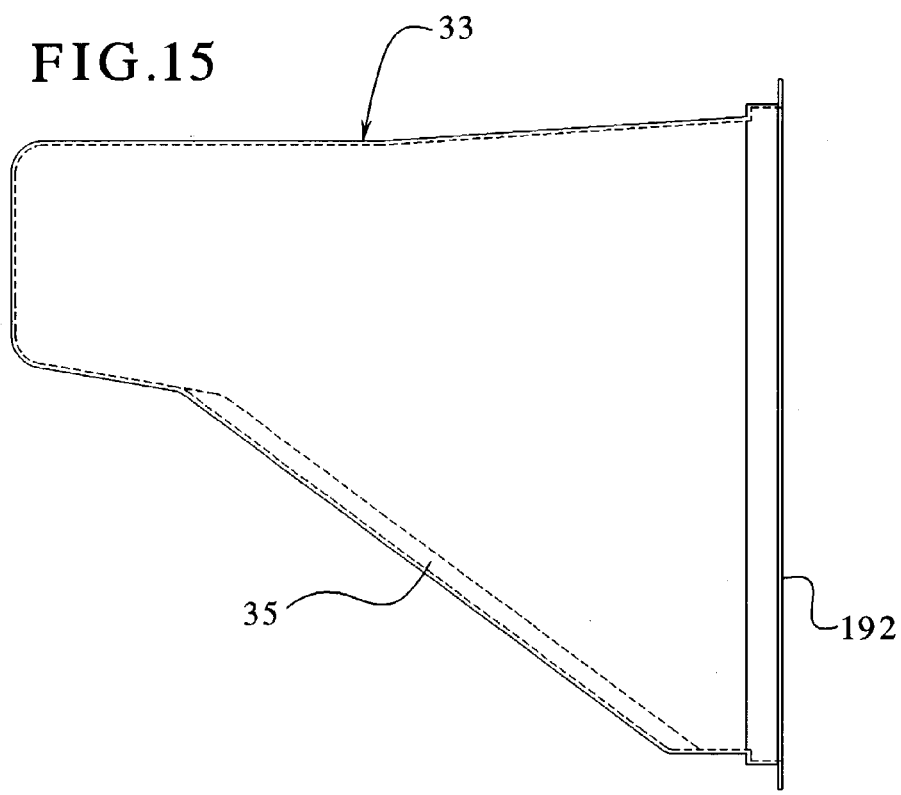
FIG. 15 is a side view of the container support of the wine or champagne preservation and dispensing apparatus of FIG. 1.
Figure 16:
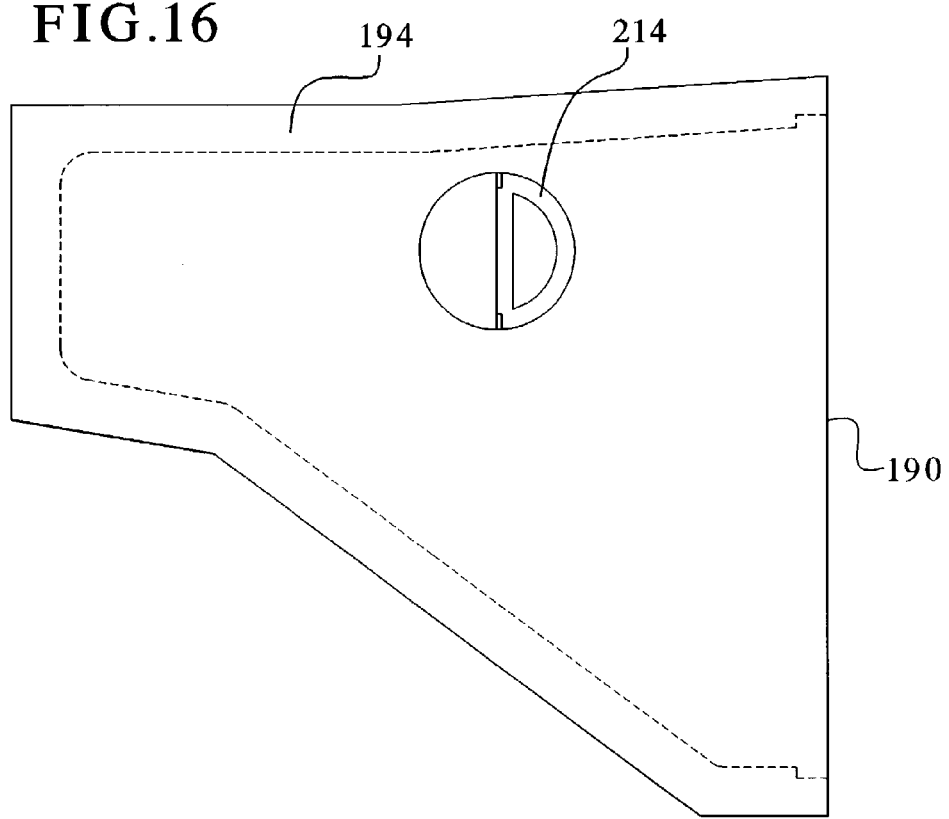
FIG. 16 is a side elevation view of an optional divider panel, adapted to be removably mounted in the container support, including insulation shown in phantom for maintaining the temperature in a divided area.
Figure 17:
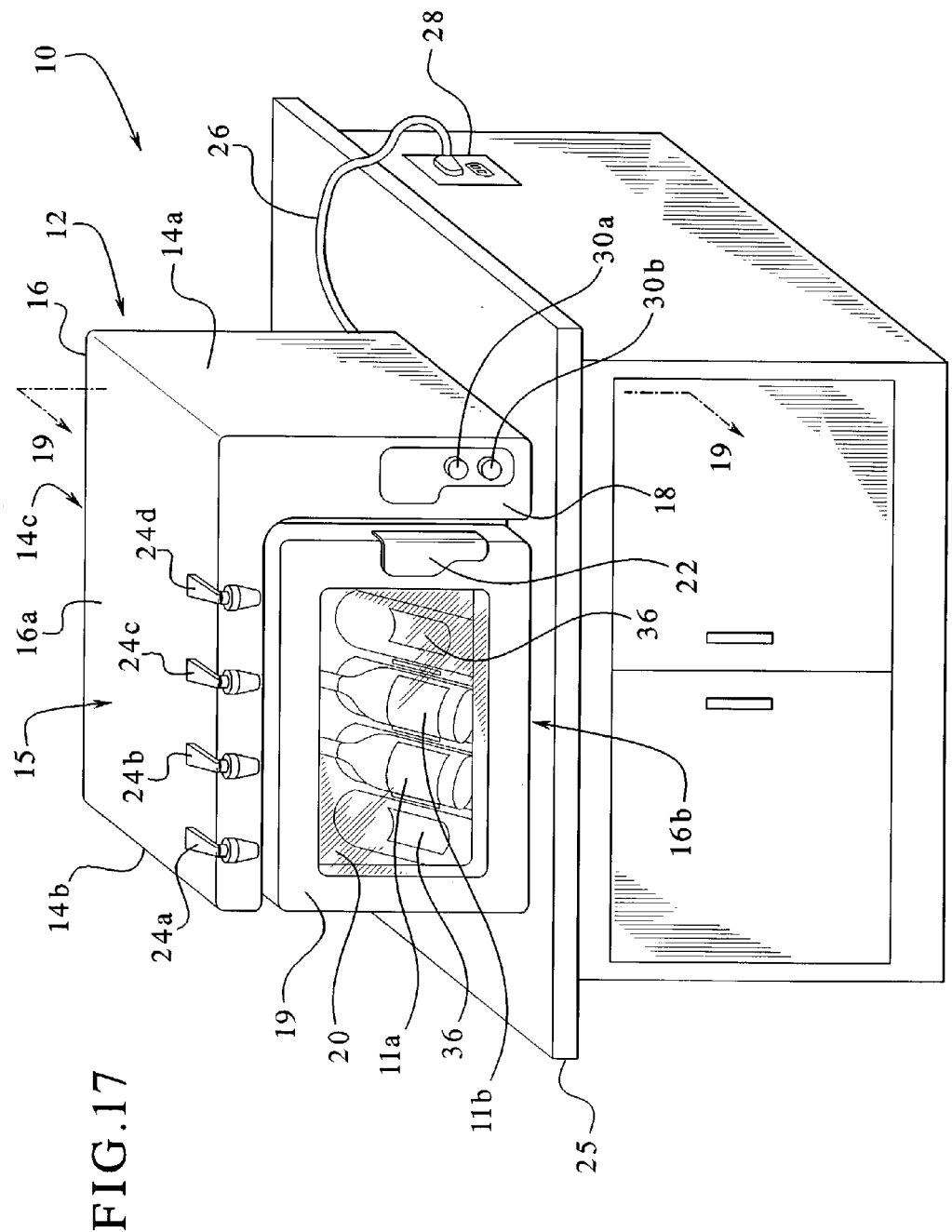
FIG. 17 is a front perspective view of the wine or champagne preservation and dispensing apparatus of one embodiment of the present invention with the door in closed position and showing the area or openings for the cooling system in the container support.
Figure 18:
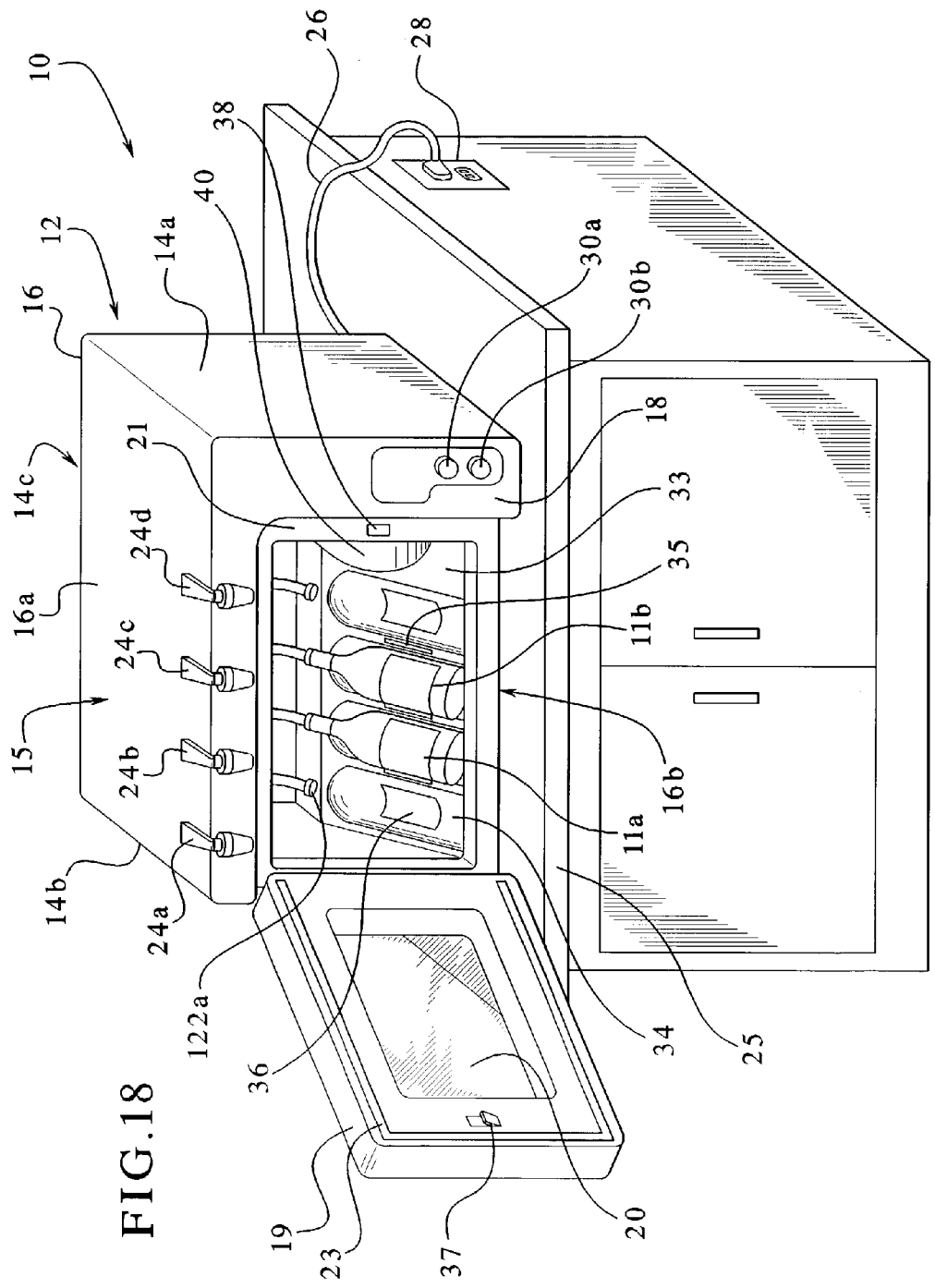
FIG. 18 is a front perspective view of the wine or champagne preservation and dispensing apparatus of FIG. 17 with the door in the open position and showing the area or openings for the cooling system in the container support.
Figure 19:
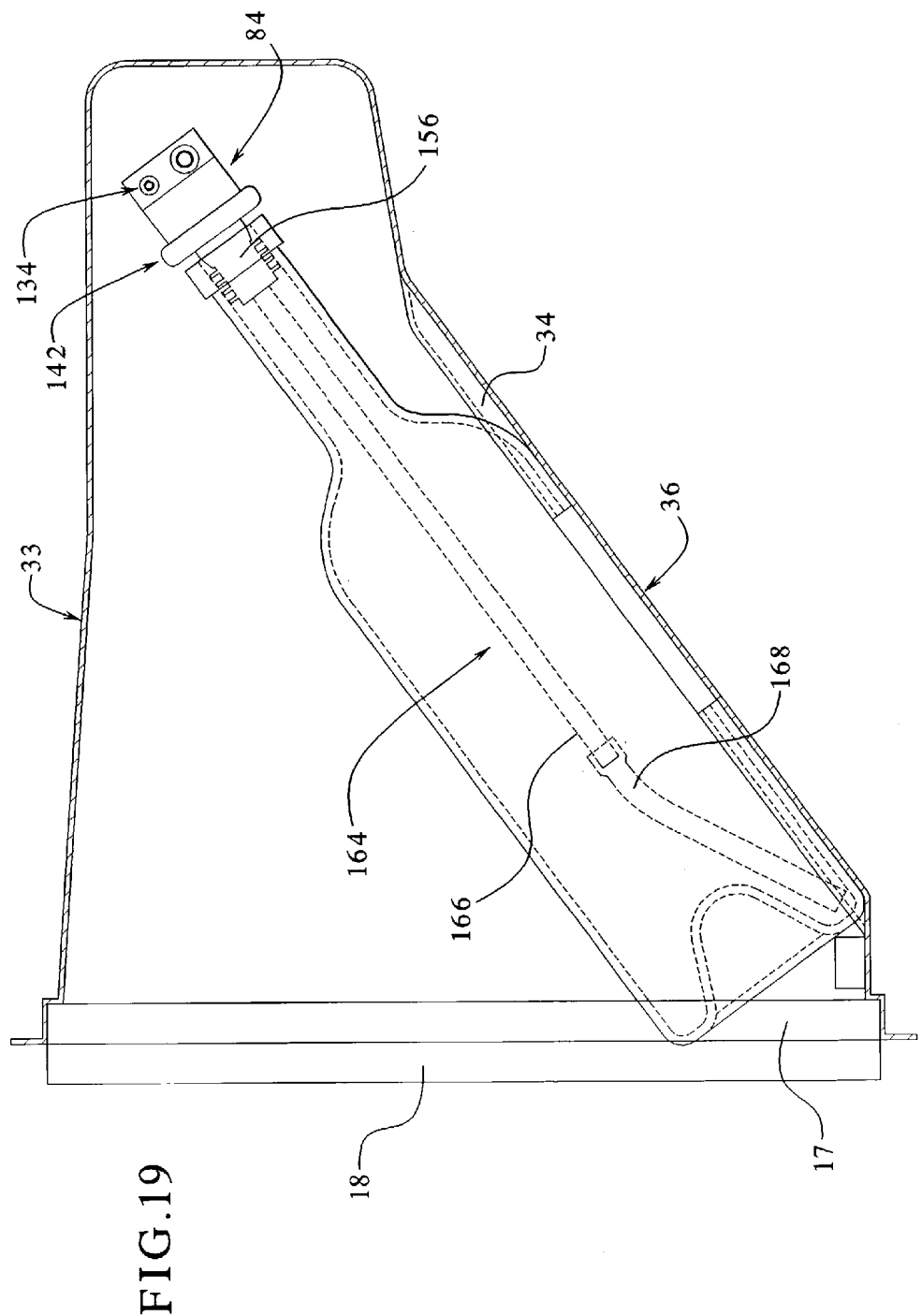
FIG. 19 is the cross-sectional view taken along a portion of line 19—19 of FIG. 17 illustrating a bottle positioned on the container support of the apparatus having an area or opening for the cooling system.

Referring now to FIGS. 14 through 16, in one embodiment the apparatus 10 includes one or two optional divider panels 190 which are used with the cooling system 44 to enable a user to chill one or more bottles to a desired temperature and keep other bottles at room temperature. In some instances, a user will place a bottle of wine or champagne in the apparatus 10 where one or more bottles require a lower storage temperature than ambient temperature. In the apparatus 10, one, two, three or four bottles may be chilled as desired. If the user wants to chill every bottle in the apparatus then the user only needs to select the desired temperature for the bottles. The cooling system 44 will cool the entire interior chamber of the apparatus 10 until the desired temperature is achieved.

If less than four bottles are chilled in the apparatus 10, then a divider panel 190 is used to separate the bottles to be chilled from the bottles that are to remain at room temperature. The divider panel 190 is placed inside the preservation and dispensing apparatus 10. Each divider panel 190 slides through the door opening in the bezel panel 18. The bottom slanted edge of each front panel 190 is fitted into a divider panel slot 35, which is disposed between each container or container receptacle 34. The divider panel 190 fits securely into the divider panel slot 35 to maintain the divider panel in place inside the apparatus 10. The divider panel 190 separates the container support into two or more sections (i.e., the divider panel 190 completely separates and seals selected bottles to a particular interior chamber area that is defined by the divider panel). In one embodiment, an air baffle 214 is formed in each divider panel 190 to allow cooled air to pass from one divided section to another to chill wine bottles to the same or different temperatures.

A divider panel 190 is placed between the container receptacles 34 to enclose a particular bottle or bottles between the divider panel 190 and the circulating fan 40 (shown in FIG. 2). Using one of the cooling system embodiments described above, the circulating fan 40 circulates air across the surface of the thermoelectric cooling plates 61 to cool the air. The cooled air is then circulated into the section or area defined by the divider panel, which includes the bottle or bottles to be chilled. The fan 40 supplies the cooled air to the divided area until a desired temperature is achieved. In this manner, a user can cool or chill some bottles and keep other bottles at ambient or room temperature within the same preservation and dispensing apparatus 10. If a user wants to chill one or more divided sections, the user simply opens the air baffle 214 to allow cool air to pass from one divided section to another.

The air baffle can be fully opened to allow the maximum amount of cooled air to pass through the baffle and completely chill a wine bottle to the maximum chill temperature. The air baffle can be partially opened to allow a medium amount of air to pass through the baffle, and therefore provide a medium or mid-level chill temperature. Also, the air baffle 214 can be fully closed to prevent cooled air from passing through the air baffle and keep the bottle at room temperature.

Referring now to FIG. 16, each divider panel 190 may include insulation 194 that attaches to the panel 190 in a suitable manner. The insulation enables the divider panels 190 to maintain a constant temperature in a particular area of the interior chamber of the housing 12. Also, the insulation minimizes leaking of cool air into another area or areas of the interior chamber. The insulation is preferably foam type insulation, however, it should be appreciated that any suitable type of insulation may be used on the divider panels 190.

The storage, preservation and dispensing apparatus 10 and the operation of this apparatus is equally suited for any types of wine or champagne. For wine, the pressure of the nitrogen rich gas is preferably approximately 5 psi. For champagne, the pressure of the nitrogen rich gas is preferably approximately 9 psi (to maintain the bubbly characteristic of champagne). Accordingly, the wine dispensing apparatus and the champagne dispensing apparatuses of the present invention are preferably two separate apparatuses, one for wine and one for champagne. However, it should be appreciated that a single unit adapted to provide different pressures for different bottles is contemplated by the present invention.

Figure 22:
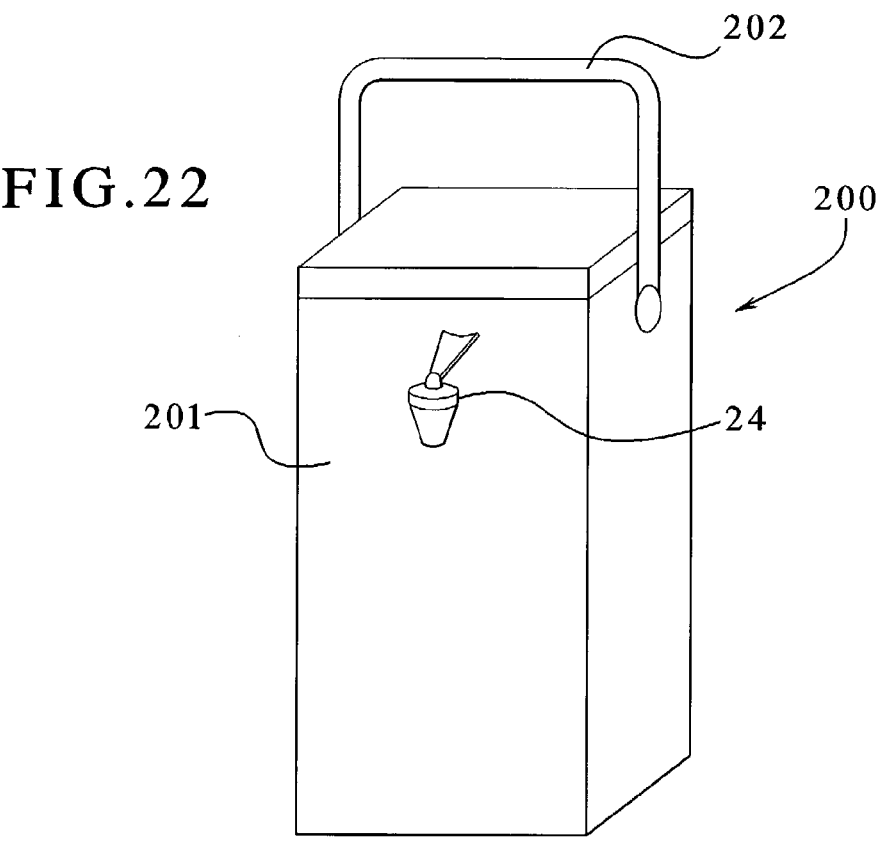
FIG. 22 is a front perspective view of one embodiment of the present invention illustrating the wine or champagne preservation and dispensing apparatus as a portable apparatus with a self-contained nitrogen generator and cooling system.
Figure 23:
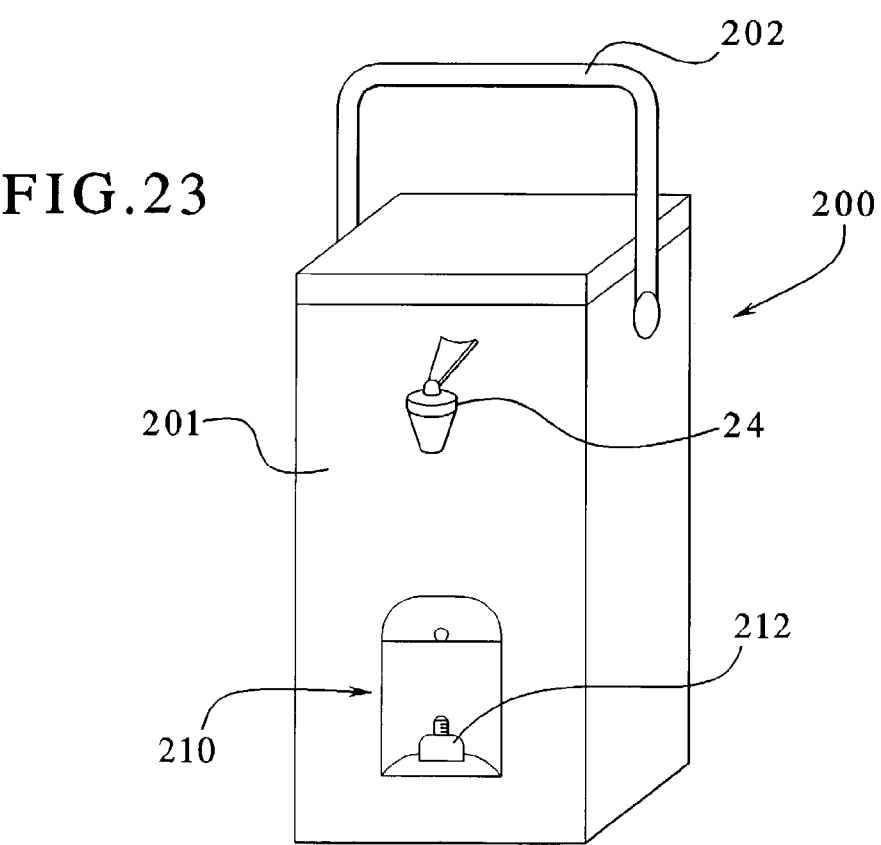
FIG. 23 is a front perspective view of one embodiment of the present invention illustrating the wine or champagne preservation and dispensing apparatus as a portable apparatus with a nitrogen cartridge attachment device.

Referring now to FIGS. 22 and 23, in another embodiment, a portable wine or champagne preservation and dispensing apparatus 200 is provided where the portable apparatus enables a user to transport wine or champagne to remote locations such as a park or picnic area. The portable apparatus 200 includes an insulated carrying pack 201 having a handle 202 for transporting one or more bottles of wine or champagne; a self-contained cooling system (not shown) mounted inside the pack for maintaining the bottles at a desired chill temperature; and a self-contained nitrogen generator (not shown) mounted inside the pack for generating nitrogen to preserve the wine or champagne in the pack. The stoppers 84 illustrated in FIG. 8, are interchangeable between the portable apparatus and the stationary apparatus described above so that a user may remove a bottle from the stationary apparatus 10 and transport it using the portable apparatus 200. Therefore, the wine or champagne does not degrade during transportation. The cooling system and the nitrogen generator operate similar to the cooling system 44 and the nitrogen generator 46 described above. The portable apparatus 200 may use several different types of power sources including a conventional electrical plug and outlet; an attachment for using the power sources in cars and other vehicles; a rechargeable battery; or any other suitable power source.

Referring now to FIG. 23, in a further embodiment of the present invention, the portable wine or champagne preservation and dispensing apparatus 200 includes an insulated carrying pack 201 with a handle or strap 202 for transporting one or two bottles of wine or champagne, a nitrogen cartridge (not shown) for generating nitrogen rich gas to preserve the contents of the bottle or bottles and one or more dispensers 24 for providing wine or champagne to a user. It should be appreciated that any suitable nitrogen cartridge may be used. The nitrogen cartridge is connected to the nitrogen connector 212 in the nitrogen receptacle 210. Stoppers 84 (illustrated in FIGS. 8 through 13) are used to seal the bottles, enable the nitrogen rich gas to enter the bottles through suitable tubing or a nitrogen communication line and enable the wine or champagne to move from a bottle to a dispenser. The stoppers 84 are interchangeable between the different types of apparatuses 10 and 200, as described above.

Figure 24B:
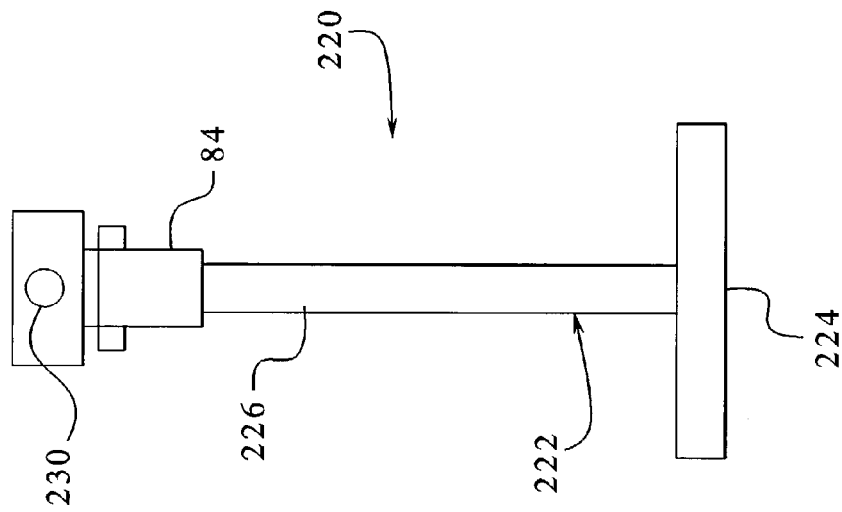
FIG. 24B is a front elevation view of the wine or champagne preservation and dispensing apparatus of the embodiment in FIG. 24A.
Figure 24A:
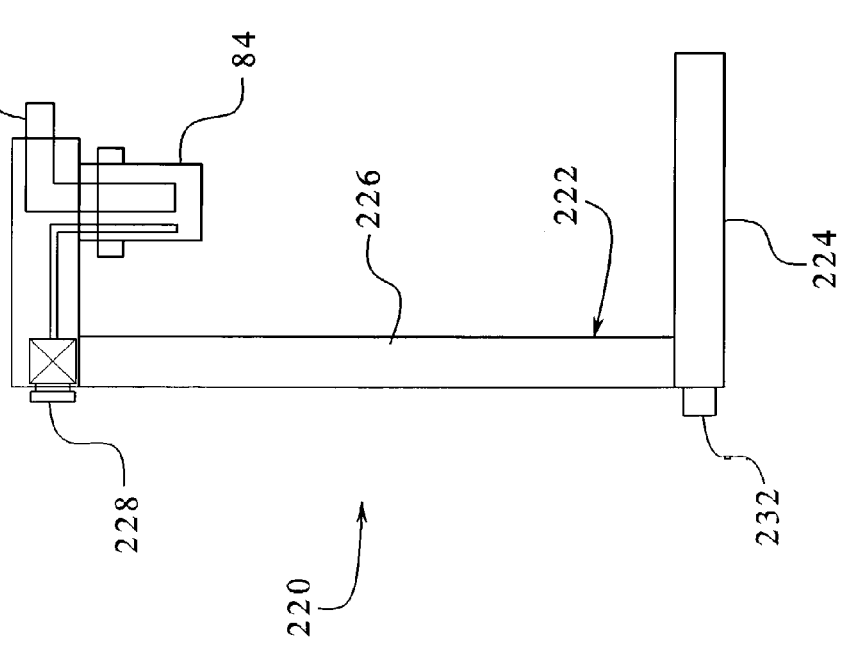
FIG. 24A is a side elevation view of the wine or champagne preservation and dispensing apparatus of one embodiment of the present invention where a single bottle can be preserved and transported.

Referring now to FIG. 24, in a further embodiment, a single bottle may be preserved and dispensed using a single bottle dispensing apparatus 220. The single bottle apparatus 220 includes a frame 222. The frame 222 is preferably manufactured using a durable plastic material. It should be appreciated, however, that the frame may be manufactured with any suitable material. The frame 222 includes a bottle or container securing member, clamp or holder 224 which fits around the diameter of the bottle and holds the frame to the bottle; a refillable nitrogen cartridge or storage container 226, for storing nitrogen to preserve wine or champagne in a bottle; a dispenser 230, for pouring the wine or champagne into a user's glass; and a stopper 84 for supplying the nitrogen to the bottle and transporting the wine or champagne from the bottle to the dispenser. A nitrogen release valve or pressure reducing valve 228 is located between the nitrogen storage container 226 and the stopper 84 to provide nitrogen from the nitrogen storage container to a bottle, or in another embodiment to a nitrogen fill port. A nitrogen fill port 232 is located at the bottom of the nitrogen storage container 226. A nitrogen cartridge or nitrogen dispenser is adapted to be connected to the nitrogen fill port 232 to fill the refillable nitrogen cartridge or storage container 226.

In operation, a user tilts the frame 221 and attached a bottle as if to pour the wine or champagne from the bottle into a glass. As the user tilts the bottle, the user presses the nitrogen release valve 228 and provides a gentle flow of nitrogen (approximately 4 psi or less) from the nitrogen storage container 226 into the bottle. An amount of wine or champagne equal to the amount of nitrogen supplied to the bottle is dispensed from the dispenser 230. When a user stops dispensing the wine or champagne from the bottle, the user releases the valve 228. The nitrogen supplied to the bottle remains in the bottle to preserve the wine or champagne.

Figure 25:
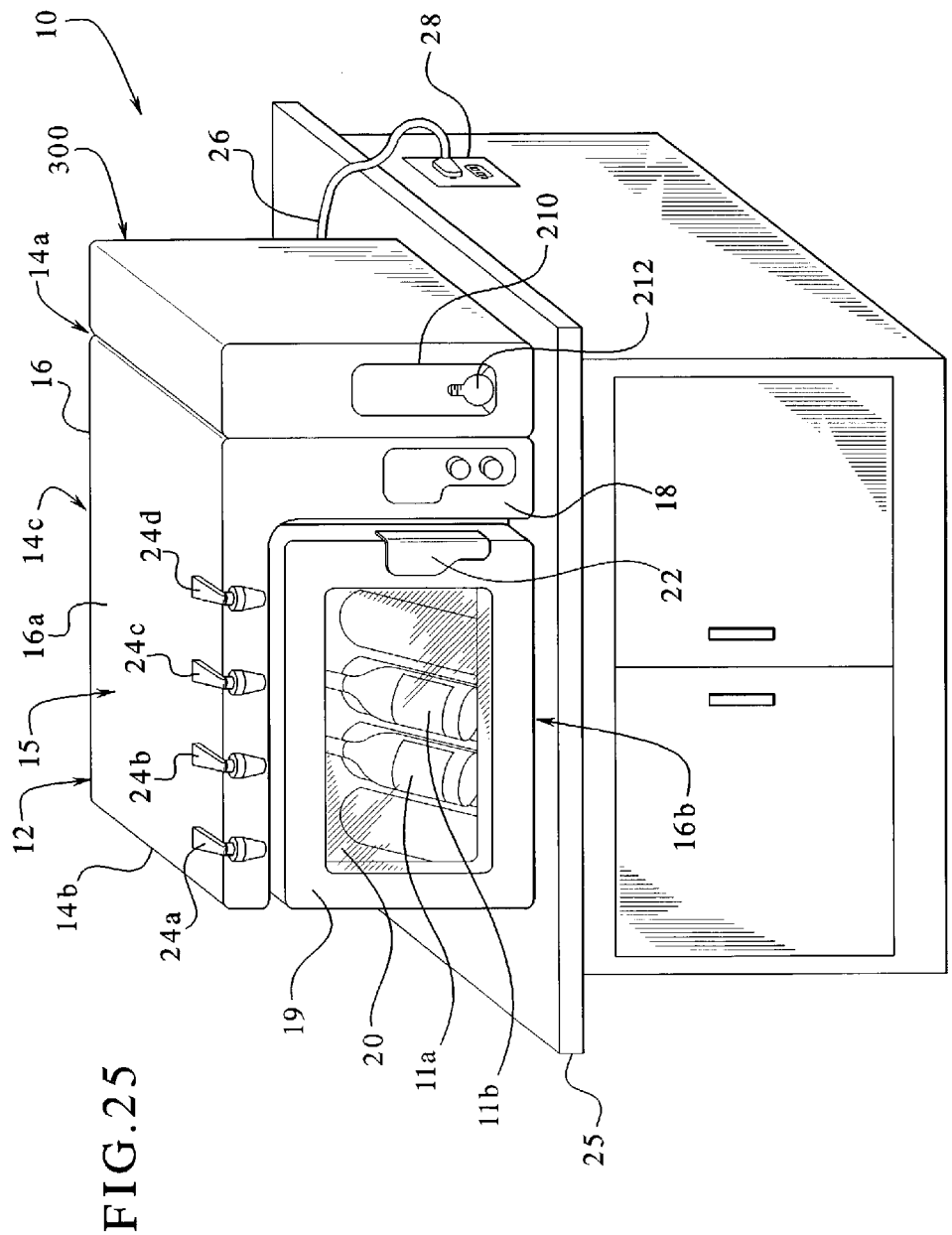
FIG. 25 is a front perspective view of the wine or champagne preservation and dispensing apparatus of one embodiment of the present invention where and optional nitrogen dispenser is connected to the apparatus.

Referring now to FIG. 25, in another embodiment, a nitrogen dispenser 300 is included as a component of the stationary wine or champagne preservation and dispensing apparatus 10. The nitrogen dispenser 300 is preferably mounted on the side of the apparatus 10 and connected to the nitrogen generator 46 (as illustrated in FIG. 5) with suitable tubing or nitrogen communication lines. The nitrogen dispenser 300 provides nitrogen rich gas from the nitrogen generator 46 and enables a user to fill or re-fill the portable nitrogen cartridges (not shown) as described above, which are used in the portable apparatus 200 (illustrated in FIG. 23). In another embodiment, the nitrogen dispenser 300 is a separate nitrogen generating unit that is manufactured and sold separately from the stationary and portable apparatuses. The nitrogen generating unit is portable or can be connected to the stationary apparatus 10 as shown in FIG. 25 or transported with the portable wine or champagne preservation and dispensing apparatuses for re-filling the nitrogen cartridges at remote locations. Similar to the portable apparatuses 200 and 220, the separate nitrogen generating unit can be powered using several different types of power sources as described above.

The nitrogen generator 46 may also be used to preserve other types of items such as old papers, paintings and family heirlooms. The nitrogen rich gas generated by the nitrogen generator replaces the air and specifically, the oxygen in the air in a housing or other suitable container to provide a nitrogen blanket inside the housing, which significantly reduces the environmental degradation and deterioration of the items.

In one alternative embodiment, the nitrogen generator of the present invention is employed in an apparatus for preserving any suitable collectible item. In one embodiment, the collectible item preserver or apparatus 400a includes a housing 401 and a nitrogen generator 46, which is mounted inside and is connected or otherwise in communication with the housing. In one embodiment, the housing 401 includes an upper, first or item storing compartment 402 and a lower, second or mechanism storing compartment 404. The item storing compartment 402 of the housing encloses the collectible item or collectible items such as painting 406 which are being preserved by the apparatus. The mechanism storing compartment 404 is separated from the item storing compartment 402 by a divider 417 or other suitable separator and includes the nitrogen generator 46. In one embodiment, the item storing compartment 402 is manufactured using a transparent material or a substantially transparent material such as glass or plastic, which enables a person to view the collectible item stored inside the housing 401. This transparent material may be used to display such collectible items as described above.

In another embodiment, the item storing compartment 402 is manufactured using a substantially non-transparent and non-translucent material such as opaque glass or plastic. This type of material prevents sunlight from entering the housing and thereby prevents exposure of the collectible item or items in the housing to the sunlight. This embodiment is employed of preservation apparatus including collectible items that are being stored or saved and not displayed. Additionally, the item storing compartment 402 is manufactured so that the compartment is air-tight. This prevents air and/or moisture from the surrounding environment from entering the housing 401 and specifically, the item storing compartment 402, which degrades and/or deteriorates the collectible item 406. The item storing compartment is also preferably manufactured using a rigid material such as plastic, which is not easily broken, punctured or otherwise penetrable. This further protects the collectible item stored in or displayed in the housing 401. It should be appreciated that the item storing compartment 402 may be manufactured using any suitable material. It should also be appreciated that the item storing compartment may be made of varies different sizes and shapes to accommodate collectible items having different sizes and/or shapes. It should further be appreciated that the nitrogen generator of the collectible item preserver does not need to be directly connected to the item storing compartment. In such a case, the nitrogen generator must be in suitable communication with such compartment.

In one embodiment, the item storing compartment 402 includes a one-way exhaust port 415, which facilitates the exhausting of the air displaced by the nitrogen gas supplied to the housing from the nitrogen generator. The exhaust port 415 may be mounted or otherwise attached to and extends from the nitrogen generator 46 and outside of the housing 401. The exhaust port 415 may be directed from or exit the housing 401 from any suitable surface or wall of the housing 401. Also, the exhaust port is connected to the housing and forms a air-tight seal with the housing. In one embodiment, the exhaust port includes a check valve or other suitable one-way valve, which enables air to be exhausted from the housing while preventing air from re-entering the housing through the exhaust port. Preferably, the exhaust port 415 is positioned and attached to the housing 401 such that the exhaust port 415 is not visible by a person viewing a collectible item inside the housing 401. It should be appreciated that the nitrogen generator could include the exhaust port and some or all of the air drawn in by the nitrogen generator cold be drawn in from inside the item storing compartment or container.

In one embodiment, the item storing compartment 401 includes a lockable door or other suitable access panel (not shown) which enables a user to open the item storing compartment 401 to place a collectible item inside the housing. It should be appreciated that the door may be any suitable type of door or access panel. It should also be appreciated that the lock or lock mechanism attached to the door may be any suitable locking device or mechanism.

The mechanism storing compartment 404 of the housing 401 is manufactured with a suitable rigid material such as plastic to enclose the nitrogen generator 46 and protect the nitrogen generator from damage and/or tampering. In one embodiment, the mechanism storing compartment 404 is manufactured using a non-transparent material or substantially non-transparent material so that the nitrogen generator 46 and other components are not visible to a person viewing the collectible item inside the housing 401. This further enhances the overall appearance of the apparatus 400a.

Figure 26:
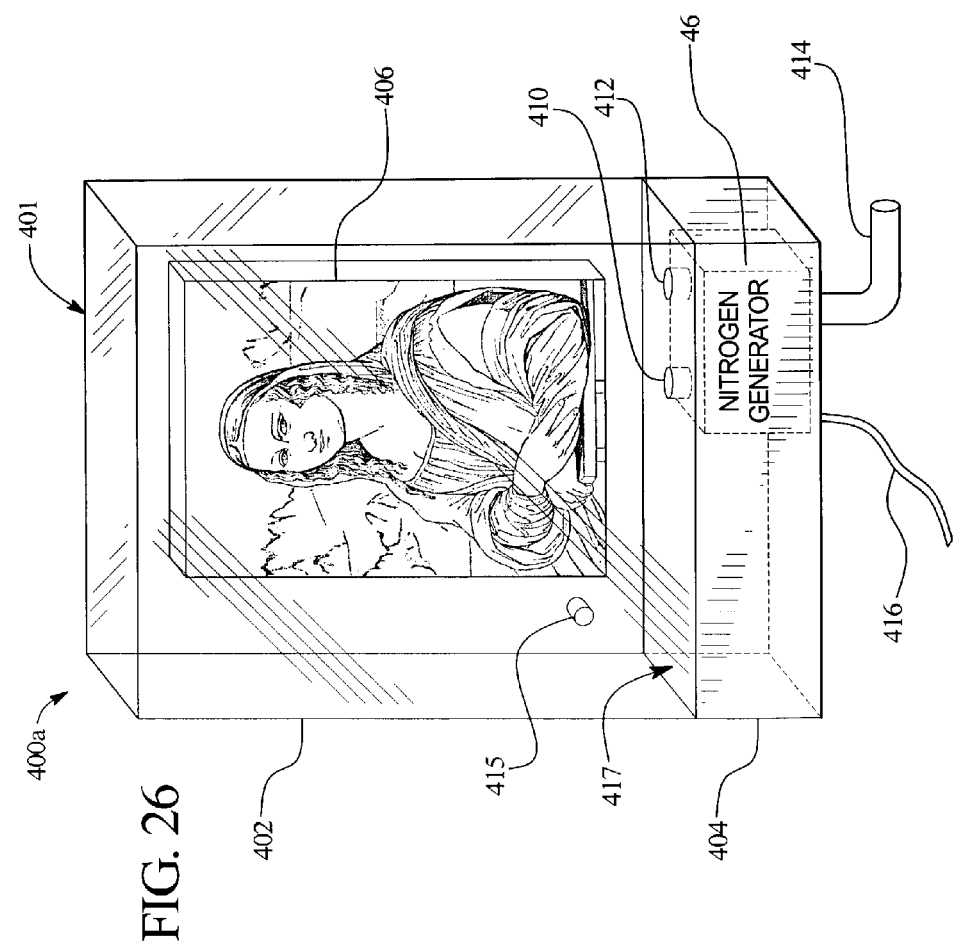
FIG. 26 is a front perspective view of one alternative embodiment of the collectible item preserver or preservation apparatus of the present invention.

The nitrogen generator 46 (as illustrated in FIGS. 5 and 26) is positioned and mounted inside the mechanism storing compartment 404 of the housing 401. In addition to the components of the nitrogen generator 46 as described above, the nitrogen generator in this embodiment further includes an inlet port 414 and at least one outlet port such as outlet ports 410 and 412. The outlet ports 410 and 412 extend from a surface of the nitrogen generator 46 and are attached to the mechanism storing surface or wall of the item storing compartment 402 of the housing 401. The outlet ports 410 and 412 are attached to the mechanism storing surface of the item storing compartment 402 such that an air-tight seal is formed between the perimeter of the outlet ports and the surface of the item storing compartment 402. Therefore, the only openings in the item storing compartment 402 are the openings to the outlet ports 410 and 412, which supply the nitrogen rich gas generated by the nitrogen generator 46. The inlet port 414 of the nitrogen generator 46 draws in ambient air (i.e., the oxygen) from outside of the housing 401 and supplies the air to the carbon molecular sieve as describe above. The carbon molecular sieve then separates the nitrogen from the air and supplies the nitrogen to the housing.

The nitrogen generator 46 also includes a power cord 416 which transfers electrical power from an electrical supply source such as a conventional electrical outlet to the nitrogen generator to provide power to the nitrogen generator 46 in a conventional manner. The power cord 416 is also positioned so that the power cord 416 is not visible by a person viewing the collectible item in the housing 401.

Figure 27:
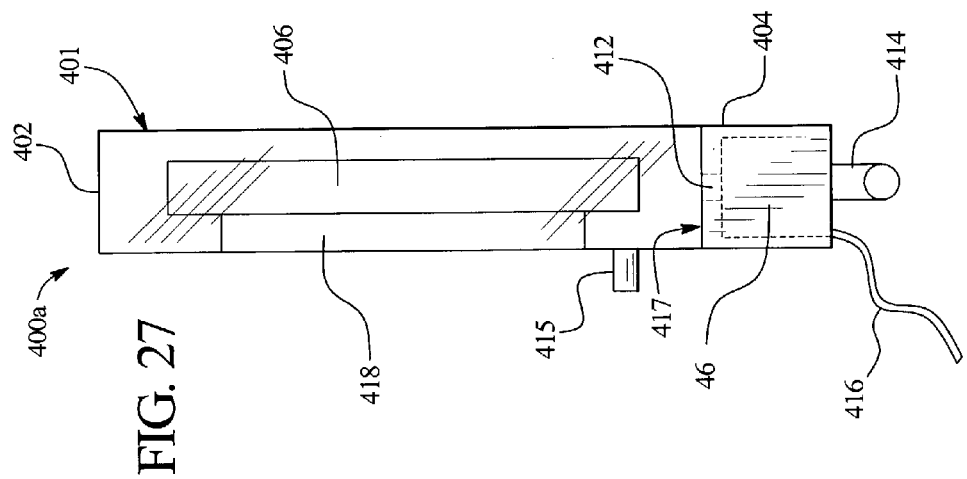
FIG. 27 is a side view of the collectible item preservation apparatus of the embodiment in FIG. 26.

Referring to FIG. 27, the collectible item such as the collectible item (i.e., painting) 406 is attached to or secured to the housing 401 with a suitable support 418. The support 418 is manufactured to accommodate the weight and size of the particular collectible item 406. The support 14 may be attached to any one or more of the inside surfaces of the housing 401 and specifically, the item storing compartment 402 of the housing. An additional support (not shown) may be used to support and/or secure the apparatus 400a to an external surface such as a wall.

In one embodiment, a collectible item such as painting 406 is positioned and secured inside the item storing compartment 402 of the housing 401. The collectible item is then sealed inside the item storing compartment 402 so that air and other environmental conditions do not effect the condition of the collectible item. The housing 401 is then positioned and secured in place in the area in which the housing may be stored and/or displayed. The power cord 416 of the nitrogen generator 46 is then plugged into a conventional outlet to supply power to the nitrogen generator in a conventional manner. The nitrogen generator draws in air through inlet port 414 and begins to generate nitrogen rich gas as described above, which is supplied to the item storing compartment 402 of the housing 401 through outlet ports 410 and 412. At the same time, the exhaust port 415 exhausts the air which is displaced by the nitrogen rich gas in the item storing compartment 402. The air is exhausted from the exhaust port 415 outside of the housing 401. The nitrogen rich gas is supplied to the item storing compartment 402 until a predetermined or desired nitrogen gas level is achieved inside the item storing compartment 402. The nitrogen level inside the item storing compartment 402 is determined by a user based on the specific collectible item or items displayed inside the housing 401 and on the condition of the particular collectible item. It should be appreciated that several other factors may be considered to determine the suitable nitrogen level inside the item storing compartment 402.

Once the desired nitrogen level is achieved inside the item storing compartment 402, the nitrogen level is then monitored using a suitable monitoring device such as a digital display or similar display (not shown) that enables a user to see the actual level of the nitrogen inside the item storing compartment 402. The presence of the nitrogen rich gas inside the item storing compartment 402 helps to preserve the collectible item 406 inside the housing 401 and maintain the condition of the collectible item. Therefore, the effects of the environmental conditions on the collectible item are significantly reduced.

Figure 28:
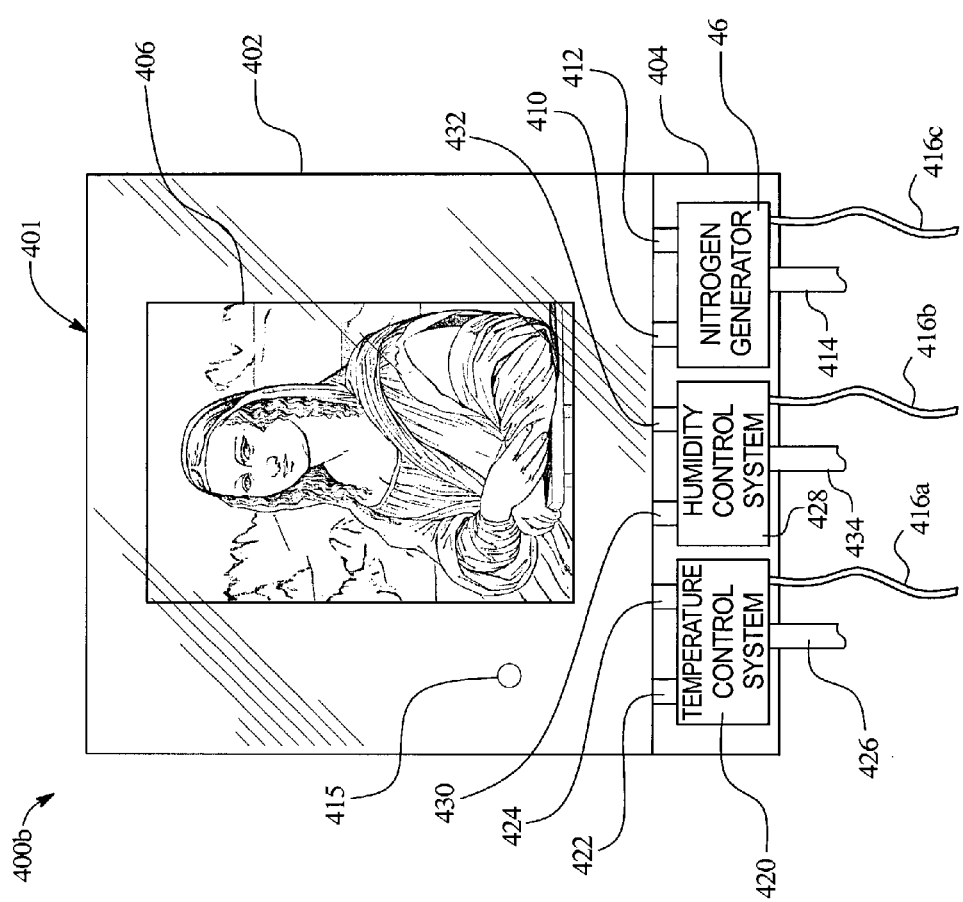
FIG. 28 is a front elevation view of an alternative embodiment of the collectible item preserver or preservation apparatus further including a temperature controller or control system and a humidity controller or control system.

Referring now to FIG. 28, another alternative embodiment of the present invention is illustrated where the apparatus 400b includes a nitrogen generator 46, a temperature controller or control system 420 and a humidity controller or control system 428. The nitrogen generator 46 operates as described above. The temperature control system 420 controls the temperature inside the item storing compartment 402 of the housing 401 to further enhance the preservation of the collectible item 406 in the housing. The temperature control system includes an inlet port 422, outlet port 424 and an exhaust port 426. The inlet port 422 receives air from inside the item storing compartment 402 and measures the temperature of the air using a suitable temperature measuring device such as a thermocouple. The user can then set a predetermined temperature for the temperature inside the item storing compartment 402. The temperature control system then adjusts the temperature of the air received by the inlet port 422 and supplies the temperature adjusted air back into the item storing compartment 402 via the outlet port 424. The circulation of the air from the inlet port 422 to the outlet port 424 helps to regulate and maintain the desired temperature of the nitrogen rich gas inside the item storing compartment 402. The exhaust port 426 displaces any excess nitrogen and/or moisture collected inside the temperature control system 420. The temperature control system is preferably powered using a power cord 416a to supply electricity from a conventional outlet to the temperature control system.

Additionally in one embodiment, a humidity controller or control system 428 is employed in this embodiment of the present invention. The humidity control system controls the humidity (i.e., the moisture level) inside the item storing compartment 402 to further preserve the collectible item 406 inside the housing 401. The humidity control system includes an inlet port 430, an outlet port 432 and an exhaust port 434. The inlet port 430 receives the nitrogen rich gas from the item storing compartment 402 and then measures the humidity level of the gas. A user specifies the desired humidity level of the nitrogen rich gas inside the item storing compartment 402 by using a suitable input attached to the humidity control system. The humidity of the nitrogen rich gas is then adjusted according to the desired humidity levels set by the user and the adjusted nitrogen rich gas is then supplied back into the item storing compartment 402 through outlet port 432. The exhaust port 434 exhausts any excess nitrogen rich gas and moisture built up inside the humidity control system 428. A power cord 416*b* is attached to the humidity control system supplies electricity from a conventional power outlet to the humidity control system in a conventional manner. In one embodiment, a display such as a digital display (not shown) is attached to and communicates with the humidity control system to enable a user to monitor the humidity level of the nitrogen rich gas inside the item storing compartment 402.

In one embodiment, the collectible preserver of the present invention includes a suitable controller such as a computer or processor in communication with the temperature control system 420, the humidity control system 428 and/or the nitrogen generator 46 to control the operation of each of these units. A user may then remotely enter the desired levels for each of the units and thereby control the units from the remote location. Furthermore, the computer may be programmed to monitor and control each of the individual systems and/or units based on predetermined temperature, humidity and nitrogen levels desired by the user. In another embodiment, the systems are monitored from a remote location using one or more suitable communication devices.

In a further embodiment, a rechargeable battery or batteries may be employed in the embodiments described above to enable a user to use the apparatus 400*a* or 400*b* at remote locations where power such as electrical power may be in limited supply. The rechargeable battery or batteries may be any suitable rechargeable batteries.

In another embodiment, an illumination device or light source (not shown) such as light emitting diode (LED), battery operated light or other suitable light source, is attached to an interior surface or wall of the item storing compartment 402 of the housing. The light source illuminates the displayed collectible item such as the painting 406 shown in FIG. 26 to enable a viewer to better see or view the collectible item in the housing. It should be appreciated that one or a plurality of light sources may be attached to a surface inside the item storing compartment. It should also be appreciated that the light source or sources may be attached to one or a plurality of the interior surfaces of the item storing compartment.

While the present invention has been described in connection with what is presently considered to be the most practical and preferred embodiments, it is to be understood that the invention is not limited to the disclosed embodiments, but on the contrary is intended to cover various modifications and equivalent arrangements included within the spirit and scope of the claims. It is thus to be understood that modifications and variations in the present invention may be made without departing from the novel aspects of this invention as defined in the claims, and that this application is to be limited only by the scope of the claims.

The invention is claimed as follows:

1. An apparatus for preserving a collectible item comprising:
   a housing, said housing adapted to enclose the collectible item;
   an inlet port mounted to the housing;
   a nitrogen generator mounted in the housing and connected to the inlet port, said nitrogen generator drawing air through the inlet port, separating nitrogen from the air and supplying the nitrogen to the housing to displace the air from inside the housing; and
   a temperature controller to control the temperature of the nitrogen rich gas inside the housing.

2. The apparatus of claim 1, wherein the housing includes a item storing compartment and a mechanism storing compartment.

3. The apparatus of claim 2, wherein the item storing compartment encloses the collectible item and the mechanism storing compartment includes the nitrogen generator.

4. The apparatus of claim 2, wherein the item storing compartment includes a lockable door for providing secure access to the item storing compartment.

5. The apparatus of claim 1, wherein the housing includes a substantially transparent material.

6. The apparatus of claim 5, which includes at least one illumination device.

7. The apparatus of claim 6, wherein the illumination device includes a light emitting diode.

8. The apparatus of claim 1, wherein the housing includes a non-transparent and non-translucent material.

9. The apparatus of claim 1, which includes an exhaust port connected to the housing.

10. The apparatus of claim 9, wherein the exhaust port includes a check valve.

11. The apparatus of claim 1, wherein the nitrogen generator includes an air compressor.

12. The apparatus of claim 11, wherein the nitrogen generator includes an air dryer fluidly connected to the air compressor.

13. The apparatus of claim 12, wherein the nitrogen generator includes an oxygen adsorbing carbon molecular sieve fluidly connected to the air dryer and which generates nitrogen rich gas.

14. The apparatus of claim 13, wherein the nitrogen generator includes a nitrogen storage tank fluidly connected to said carbon molecular sieve and which stores the generated nitrogen rich gas.

15. The apparatus of claim 13, which includes a pressure retaining valve connected to the carbon molecular sieve, said pressure retaining valve set to open at a preset pressure.

16. The apparatus of claim 11, which includes a relay switch connected to the air compressor.

17. The apparatus of claim 1, which includes a plurality of housings.

18. The apparatus of claim 17, which includes a manifold having an inlet connected to the nitrogen generator and a plurality of outlets connected to each of the housings.

19. The apparatus of claim 11, which includes an electronic controller connected to and adapted to control the air compressor.

20. The apparatus of claim 1, which includes a humidity controller to control the humidity of the nitrogen rich gas inside the housing.

21. The apparatus of claim 1, which includes at least one illumination device.

22. The apparatus of claim 21, wherein the illumination device includes a light emitting diode.

23. An apparatus for preserving a collectible item comprising:
   a housing, said housing adapted to enclose the collectible item;
   an inlet port mounted to the housing;
   a nitrogen generator mounted in the housing and connected to the inlet port, said nitrogen generator drawing air through the inlet port, separating nitrogen from the air and supplying the nitrogen to the housing to displace the air from inside the housing, wherein the nitrogen generator includes an air compressor, an air dryer fluidly connected to the air compressor, an oxygen adsorbing carbon molecular sieve fluidly connected to the air dryer and which generates nitrogen rich gas; and a nitrogen storage tank fluidly connected to said carbon molecular sieve and which stores the generated nitrogen rich gas.

24. An apparatus for preserving a collectible item comprising:

a housing including an item storing compartment and a mechanism storing compartment, said item storing compartment adapted to enclose at least one collectible item, said mechanism storing compartment including a nitrogen generator;

a lockable door movably connected to the item storing compartment for providing secure access to the item storing compartment;

an inlet port mounted to the mechanism storing compartment and adapted to be in communication with the nitrogen generator to draw in ambient air;

an exhaust port connected to the item storing compartment of the housing to exhaust air displaced by nitrogen rich gas generated and supplied by the nitrogen generator to the item storing compartment, wherein the nitrogen generator generates the nitrogen rich gas by drawing in ambient air through the inlet port and separating nitrogen from the air; and a temperature controller to control the temperature of the nitrogen rich gas inside the housing.

25. The apparatus of claim 24, wherein the item storing compartment includes a substantially transparent material.

26. The apparatus of claim 24, wherein the mechanism storing compartment includes a non-transparent and non-translucent material.

27. The apparatus of claim 24, wherein the exhaust port includes a check valve.

28. The apparatus of claim 24, wherein the nitrogen generator includes an air compressor, an air dryer fluidly connected to the air compressor, an oxygen adsorbing carbon molecular sieve fluidly connected to the air dryer to separate nitrogen from the air and a nitrogen storage tank fluidly connected to the carbon molecular sieve and adapted to store the nitrogen separated from the air.

29. The apparatus of claim 28, which includes a pressure retaining valve connected to the carbon molecular sieve, said pressure retaining valve set to open at a preset pressure.

30. The apparatus of claim 28, which includes a relay switch connected to the air compressor.

31. The apparatus of claim 28, which includes an electronic controller connected to and adapted to control the air compressor.

32. The apparatus of claim 24, which includes a humidity controller to control the humidity of the nitrogen rich gas inside the housing.

33. The apparatus of claim 24, which includes at least one illumination device.

34. The apparatus of claim 33, wherein the illumination device includes a light emitting diode.

35. An apparatus for preserving a plurality collectible items comprising:

a plurality of housings, each said housing adapted to enclose one of the collectible items;

an inlet port;

a nitrogen generator operable to draw air through the inlet port, separate nitrogen from the air and supply the nitrogen to the housings to displace the air from inside the housings; and a manifold having an inlet connected to the nitrogen generator and a plurality of outlets connected to the housings.

36. An inert gas generator for a collectible item preservation apparatus including a housing adapted to receive at least one collectible item, an air inlet port, an air exhaust port, at least one inert gas communication line connected to an inert rich gas source and adapted to be fluidly connected to the housing to direct the inert gas from the inert gas source into the housing and displace air from the housing out through the air exhaust port to preserve the collectible item in the housing, wherein the inert gas generator comprises:

an air compressor connected to the housing;

a pressure controller connected to the air compressor;

an air dryer fluidly connected to the air compressor;

an oxygen adsorbing device fluidly connected to the air dryer;

a pressure retainer connected to the oxygen adsorbing device;

an inert gas storage tank fluidly connected to the oxygen adsorbing device; and a pressure reducer connected to the inert gas storage tank.

37. The inert gas generator of claim 36, wherein the oxygen adsorbing device includes a carbon molecular sieve.

38. The inert gas generator of claim 36, which includes a controller connected to the air compressor.

39. The inert gas generator of claim 36, which includes a filtering device fluidly connected to said air dryer and adapted to generate an inert gas from the ambient air.

40. The inert gas generator of claim 39, wherein the filtering device is a carbon molecular sieve.

41. The inert gas generator of claim 36, wherein the inert gas is nitrogen.

42. The inert gas generator of claim 36, which includes a controller connected to the air compressor.

43. A method of preserving a collectible item comprising:

(a) generating nitrogen rich gas;

(b) storing the nitrogen rich gas in a nitrogen storage tank;

(c) supplying the nitrogen rich gas into a housing, which encloses the collectible item, while displacing air from inside the housing; and (d) exhausting the air from the housing wherein steps (a) and (b) are performed in or adjacent to the housing.

44. The method of claim 43, wherein the step of generating the nitrogen rich gas includes adsorbing oxygen from ambient air using a carbon molecular sieve.

45. The method of claim 43, which includes the step of adjusting the temperature of the nitrogen rich gas inside the housing using a temperature control system.

46. The method of claim 43, which includes the step of adjusting the humidity of the nitrogen rich gas inside the housing using a humidity control system.

47. The method of claim 43, which includes the step of illuminating the inside of the housing using at least one illumination device.

48. The apparatus of claim 47, wherein the illumination device includes a light emitting diode.

49. An apparatus for preserving a collectible item comprising:

a housing including an item storing compartment and a mechanism storing compartment, said item storing compartment adapted to enclose at least one collectible item, said mechanism storing compartment including a nitrogen generator, wherein the nitrogen generator includes an air compressor, an air dryer fluidly connected to the air compressor, an oxygen absorbing carbon molecular sieve fluidly connected to the air dryer to separate nitrogen from the air and a nitrogen storage tank fluidly connected to the carbon molecular sieve and adapted to store the nitrogen separated from the air;
a lockable door movably connected to the item storing compartment for providing secure access to the item storing compartment;
an inlet port mounted to the mechanism storing compartment and adapted to be in communication with the nitrogen generator to draw in ambient air; and
an exhaust port connected to the item storing compartment of the housing to exhaust air displaced by nitrogen rich gas generated and supplied by the nitrogen generator to the item storing compartment, wherein the nitrogen generator generates the nitrogen rich gas by drawing in ambient air through the inlet port and separating nitrogen from the air.

50. A method of preserving a collectible item comprising:
(a) generating nitrogen rich gas;
(b) supplying the nitrogen rich gas into a housing, which encloses the collectible item, while displacing air inside the housing;
(c) exhausting the air from the housing; and
(d) adjusting the temperature of the nitrogen rich gas inside the housing using a temperature control system.

51. The method of claim 50, wherein the step of generating the nitrogen rich gas includes adsorbing oxygen from ambient air using a carbon molecular sieve.

52. The method of claim 50, which includes the step of adjusting the humidity of the nitrogen rich gas inside the housing using a humidity control system.

53. The method of claim 50, which includes the step of illuminating the inside of the housing using at least one illumination device.

54. The apparatus of claim 53, wherein the illumination device includes a light emitting diode.

55. A method of preserving a collectible item comprising:
(a) generating nitrogen rich gas;
(b) supplying the nitrogen rich gas into a housing, which encloses the collectible item, while displacing air inside the housing;
(c) exhausting the air from the housing; and
(d) adjusting the humidity of the nitrogen rich gas inside the housing using a humidity control system.

56. The method of claim 55, which includes the step of illuminating the inside of the housing using at least one illumination device.

57. The apparatus of claim 56, wherein the illumination device includes a light emitting diode.

58. An apparatus for preserving a collectible item comprising:
a housing, said housing adapted to enclose the collectible item;
an inlet port mounted to the housing;
a nitrogen generator mounted in the housing and connected to the inlet port, said nitrogen generator drawing air through the inlet port, separating nitrogen from the air and supplying the nitrogen to the housing to displace the air from inside the housing; and
a humidity controller to control the humidity of the nitrogen rich gas inside the house.

59. The apparatus of claim 58, wherein the housing includes a item storing compartment and a mechanism storing compartment.

60. The apparatus of claim 59, wherein the item storing compartment encloses the collectible item and the mechanism storing compartment includes the nitrogen generator.

61. The apparatus of claim 59, wherein the item storing compartment includes a lockable door for providing secure access to the item storing compartment.

62. The apparatus of claim 58, which includes an exhaust port connected to the housing.

63. The apparatus of claim 62, wherein the exhaust port includes a check valve.

64. The apparatus of claim 58, wherein the nitrogen generator includes an air compressor.

65. The apparatus of claim 64, wherein the nitrogen generator includes an air dryer fluidly connected to the air compressor.

66. The apparatus of claim 65, wherein the nitrogen generator includes an oxygen adsorbing carbon molecular sieve fluidly connected to the air dryer and which generates nitrogen rich gas.

67. The apparatus of claim 66, wherein the nitrogen generator includes a nitrogen storage tank fluidly connected to said carbon molecular sieve and which stores the generated nitrogen rich gas.

68. The apparatus of claim 66, which includes a pressure retaining valve connected to the carbon molecular sieve, said pressure retaining valve set to open at a preset pressure.

69. The apparatus of claim 64, which includes a relay switch connected to the air compressor.

70. The apparatus of claim 58, which includes a plurality of housings.

71. The apparatus of claim 70, which includes a manifold having an inlet connected to the nitrogen generator and a plurality of outlets connected to each of the housings.

72. The apparatus of claim 65, which includes an electronic controller connected to and adapted to control the air compressor.

73. An apparatus for preserving a collectible item comprising:
a housing including an item storing compartment and a mechanism storing compartment, said item storing compartment adapted to enclose at least one collectible item, said mechanism storing compartment including a nitrogen generator;
a lockable door movably connected to the item storing compartment for providing secure access to the item storing compartment;
an inlet port mounted to the mechanism storing compartment and adapted to be in communication with the nitrogen generator to draw in ambient air;
an exhaust port connected to the item storing compartment of the housing to exhaust air displaced by nitrogen rich gas generated and supplied by the nitrogen generator to the item storing compartment, wherein the nitrogen generator generates the nitrogen rich gas by drawing in ambient air through the inlet port and separating nitrogen from the air; and
a humidity controller to control the humidity of the nitrogen rich gas inside the housing.

74. The apparatus of claim 73, wherein the nitrogen generator includes an air compressor, an air dryer fluidly connected to the air compressor, an oxygen adsorbing carbon molecular sieve fluidly connected to the air dryer to separate nitrogen from the air and a nitrogen storage tank fluidly connected to the carbon molecular sieve and adapted to store the nitrogen separated from the air.

75. The apparatus of claim 74, which includes a pressure retaining valve connected to the carbon molecular sieve, said pressure retaining valve set to open at a preset pressure.

76. The apparatus of claim 74, which includes a relay switch connected to the air compressor.

77. An item preservation apparatus comprising:
- a housing which defines a compartment sized to hold and enclose an item;
- a nitrogen generator connected to the housing, said nitrogen generator operable to draw in air through an inlet port, separate nitrogen from the drawn in air and supply nitrogen rich gas to the compartment of the housing to displace air from inside the compartment of the housing to preserve the item; and
- a temperature controller operable to control the temperature of the nitrogen rich gas inside the compartment of the housing.

78. The apparatus of claim 77, wherein the item storing compartment includes a lockable door for providing secure access to the item storing compartment.

79. The apparatus of claim 77, wherein the nitrogen generator includes an air compressor.

80. The apparatus of claim 79, wherein the nitrogen generator includes an air dryer fluidly connected to the air compressor.

81. The apparatus of claim 80, wherein the nitrogen generator includes an oxygen adsorbing carbon molecular sieve fluidly connected to the air dryer and which generates nitrogen rich gas.

82. The apparatus of claim 81, wherein the nitrogen generator includes a nitrogen storage tank fluidly connected to said carbon molecular sieve and which stores the generator nitrogen rich gas.

83. The apparatus of claim 77, which includes a humidity controller to control the humidity of the nitrogen rich gas inside the compartment of the housing.

84. An item preservation apparatus comprising:
- a housing which defines a compartment sized to hold and enclose an item;
- a nitrogen generator connected to the housing said nitrogen generator operable to draw in air through an inlet port, separate nitrogen from the draw in air and supply nitrogen rich gas to the compartment of the housing to displace the air from inside the compartment of the housing to preserve the item; and
- a humidity controller operable to control the humidity of the nitrogen rich gas inside the compartment of the house.

85. The apparatus of claim 84, wherein the nitrogen generator includes an air dryer fluidly connected to the air compressor.

86. The apparatus of claim 85, wherein the nitrogen generator includes an oxygen adsorbing carbon molecular sieve fluidly connected to the air dryer and which generates nitrogen rich gas.

87. The apparatus of claim 86, wherein the nitrogen generator includes a nitrogen storage tank fluidly connected to said carbon molecular sieve and which stores the generated nitrogen rich gas.

88. The apparatus of claim 87, which includes a pressure retaining valve connected to the carbon molecular sieve, said pressure retaining valve set to open at a preset pressure.

* * * * *